Jan. 12, 1932.  B. M. SHIPLEY  1,840,640
CASH REGISTER
Filed July 24, 1922  14 Sheets-Sheet 4

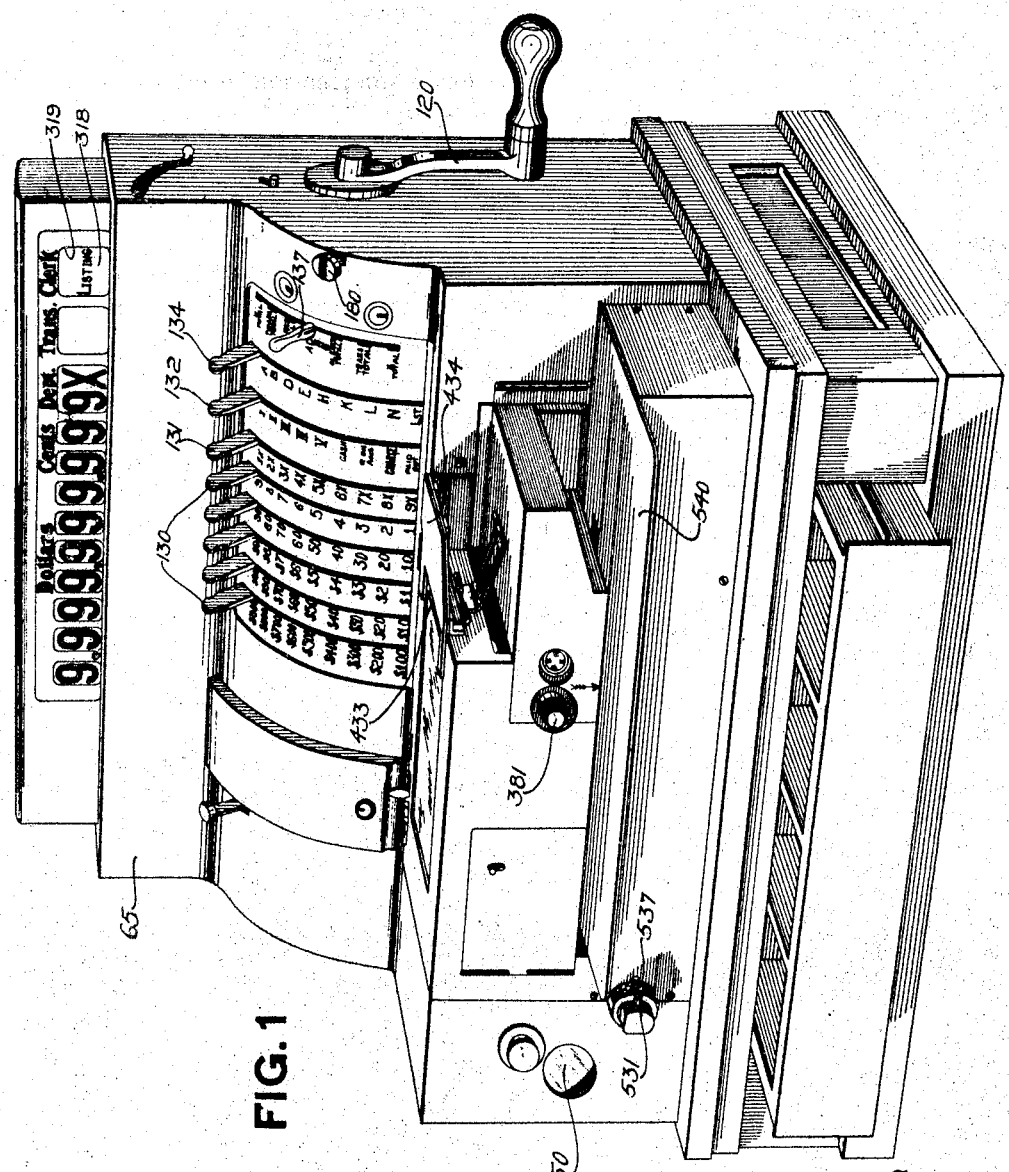

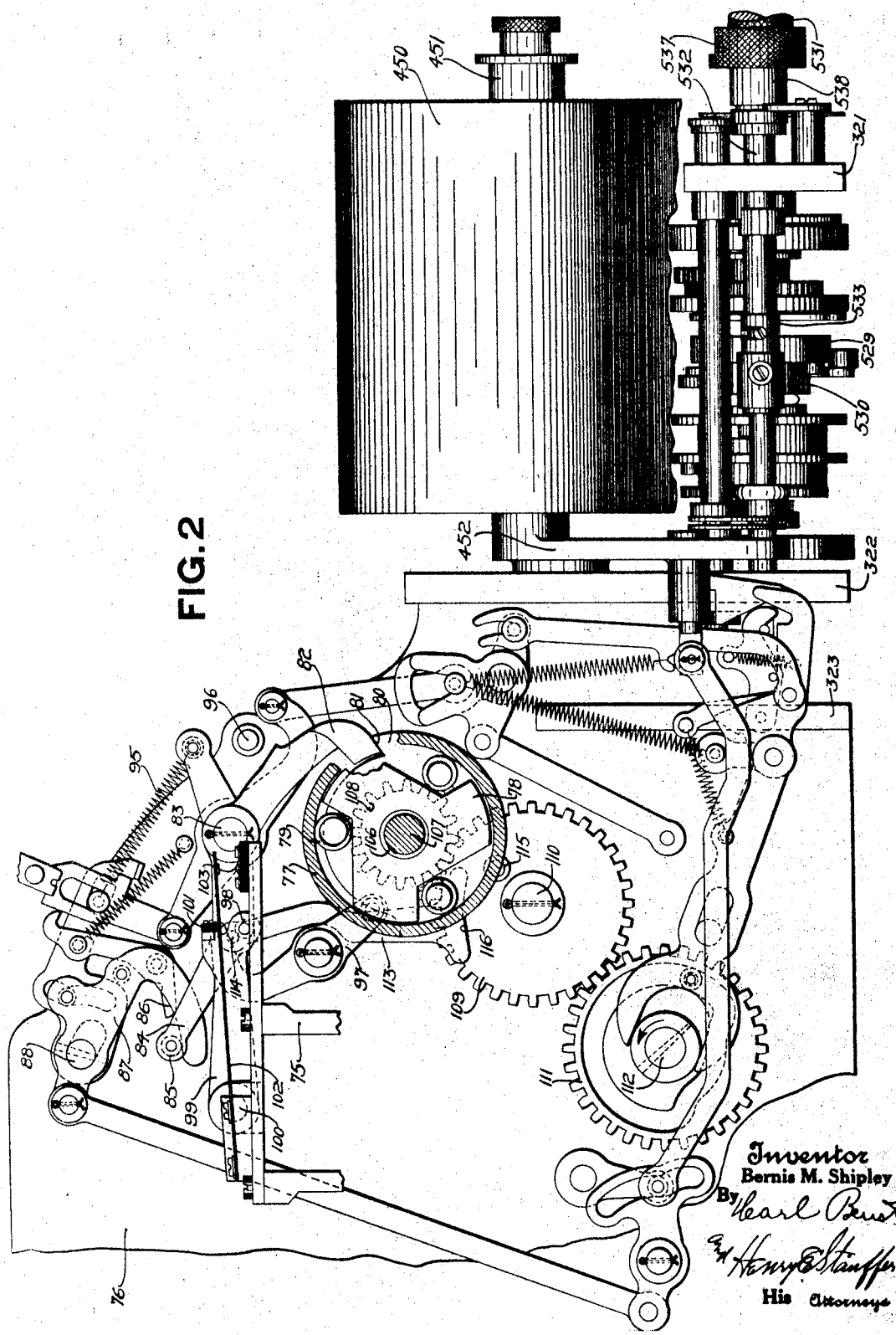

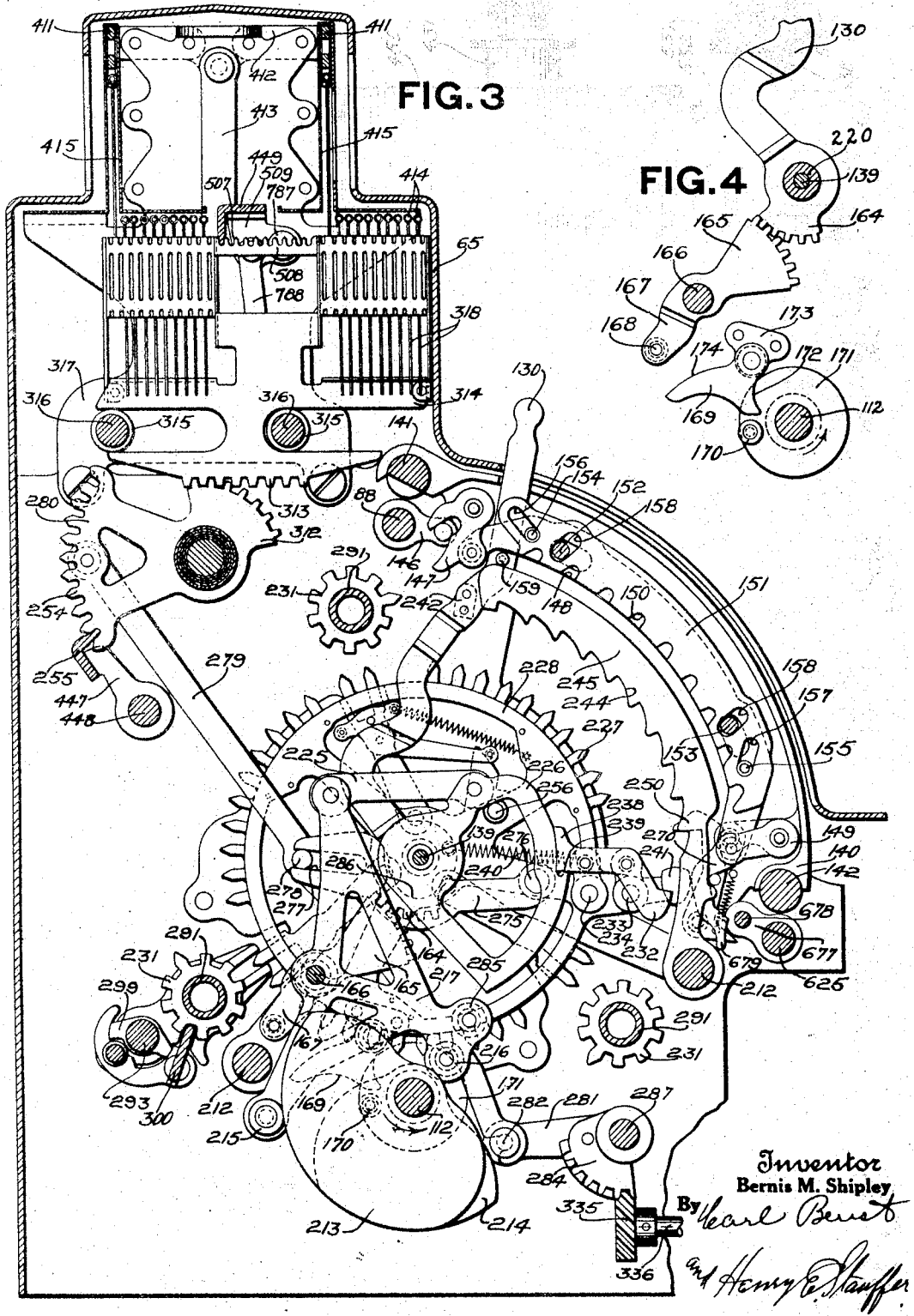

Inventor
Bernis M. Shipley
By Carl Beust
and Henry C. Stauffer
His Attorneys

Jan. 12, 1932.  B. M. SHIPLEY  1,840,640
CASH REGISTER
Filed July 24, 1922  14 Sheets-Sheet 5

Inventor
Bernis M. Shipley
By Earl Beust
and Henry E. Stauffer
His Attorneys

Jan. 12, 1932.  B. M. SHIPLEY  1,840,640
CASH REGISTER
Filed July 24, 1922  14 Sheets-Sheet 6

Inventor
Bernis M. Shipley
By Carl Beust
Henry E. Stauffer
His Attorneys

Jan. 12, 1932. B. M. SHIPLEY 1,840,640
CASH REGISTER
Filed July 24, 1922 14 Sheets-Sheet 7
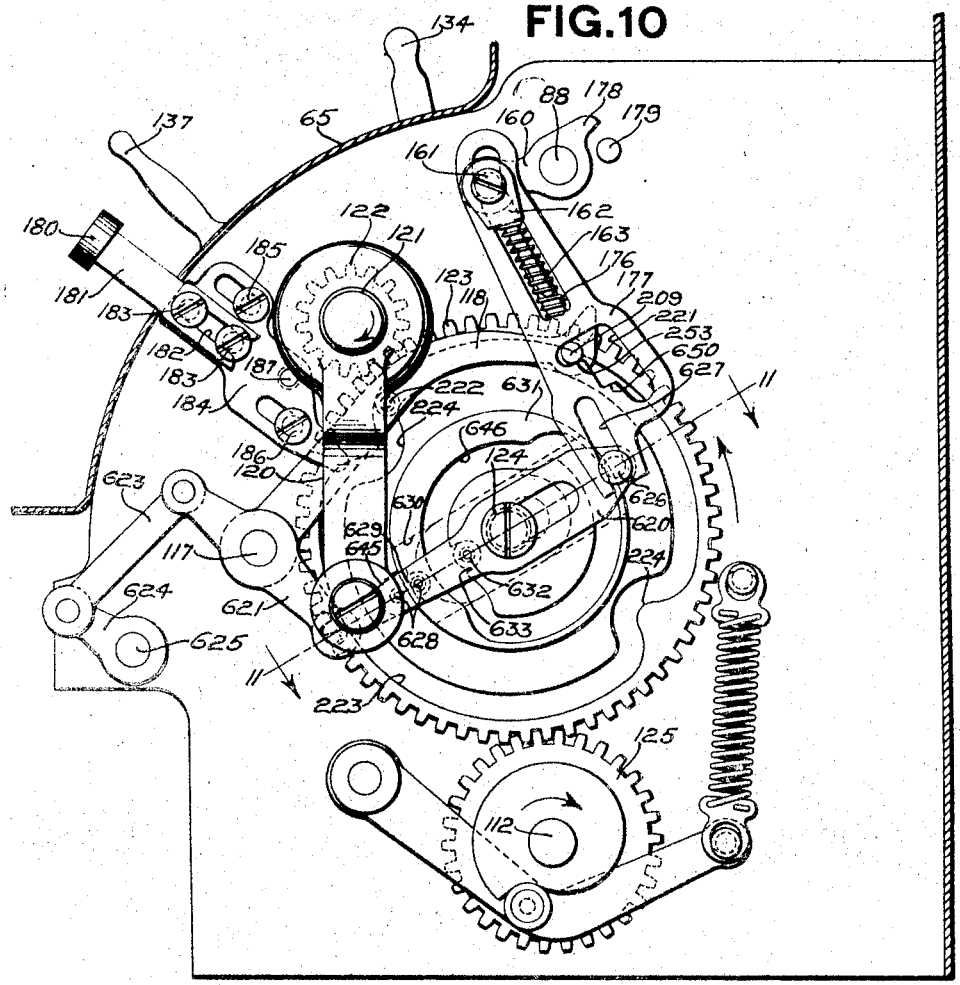
Inventor
Bernis M. Shipley
By Earl Beust
and Henry E. Stauffer
His Attorneys

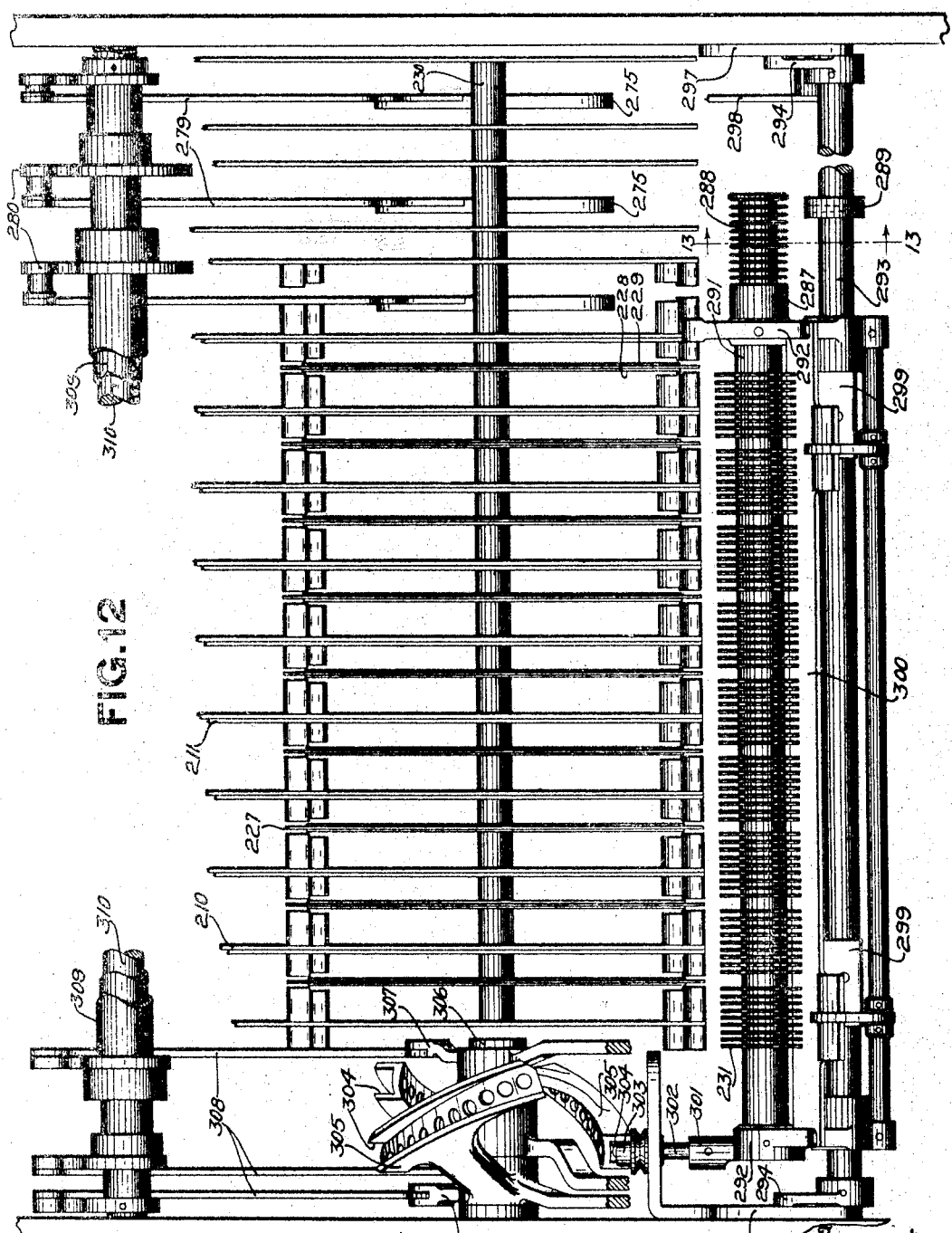
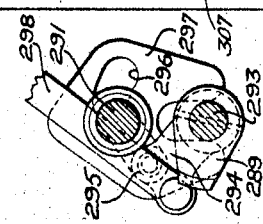

Jan. 12, 1932.   B. M. SHIPLEY   1,840,640
CASH REGISTER
Filed July 24, 1922   14 Sheets-Sheet 9
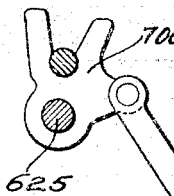
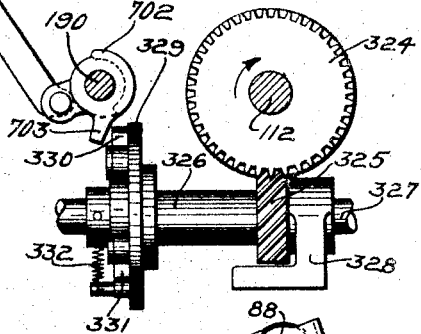
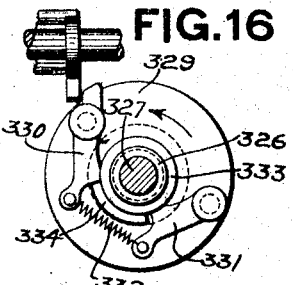
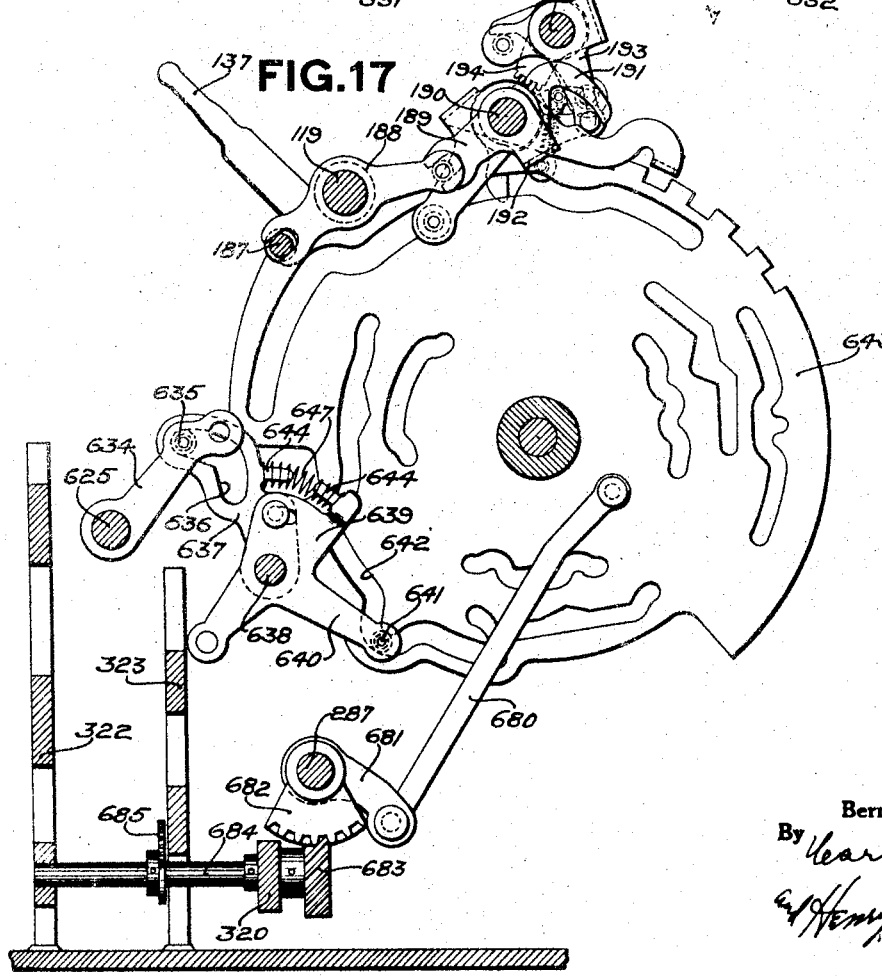
Inventor
Bernis M. Shipley
By Pearl Benst
Henry E. Stauffer
His Attorneys

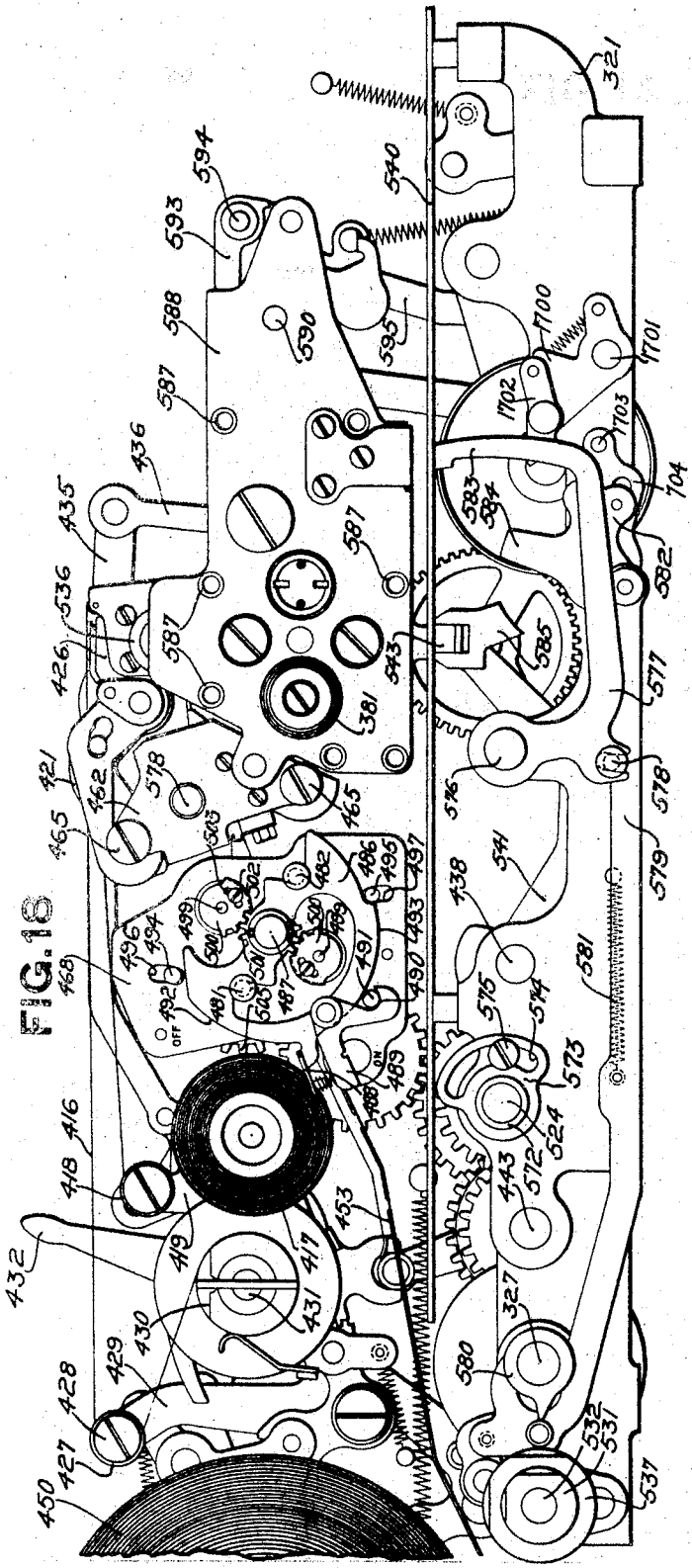
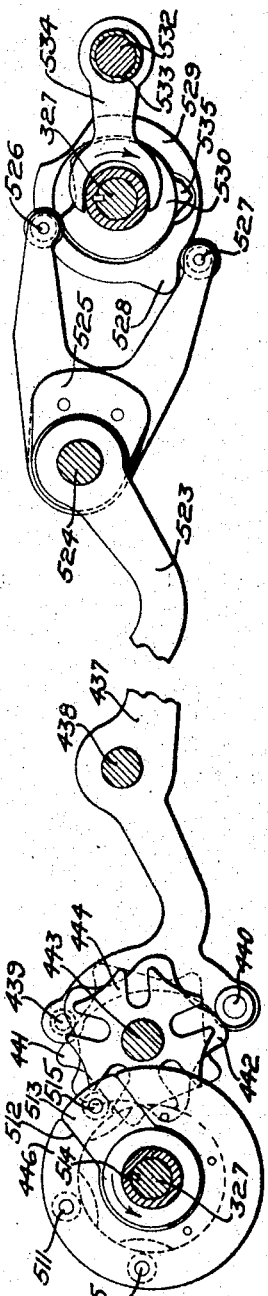
FIG. 18
FIG. 19
FIG. 20
Inventor
Bernis M. Shipley
His Attorneys Jan. 12, 1932.  B. M. SHIPLEY  1,840,640
CASH REGISTER
Filed July 24, 1922  14 Sheets-Sheet 11
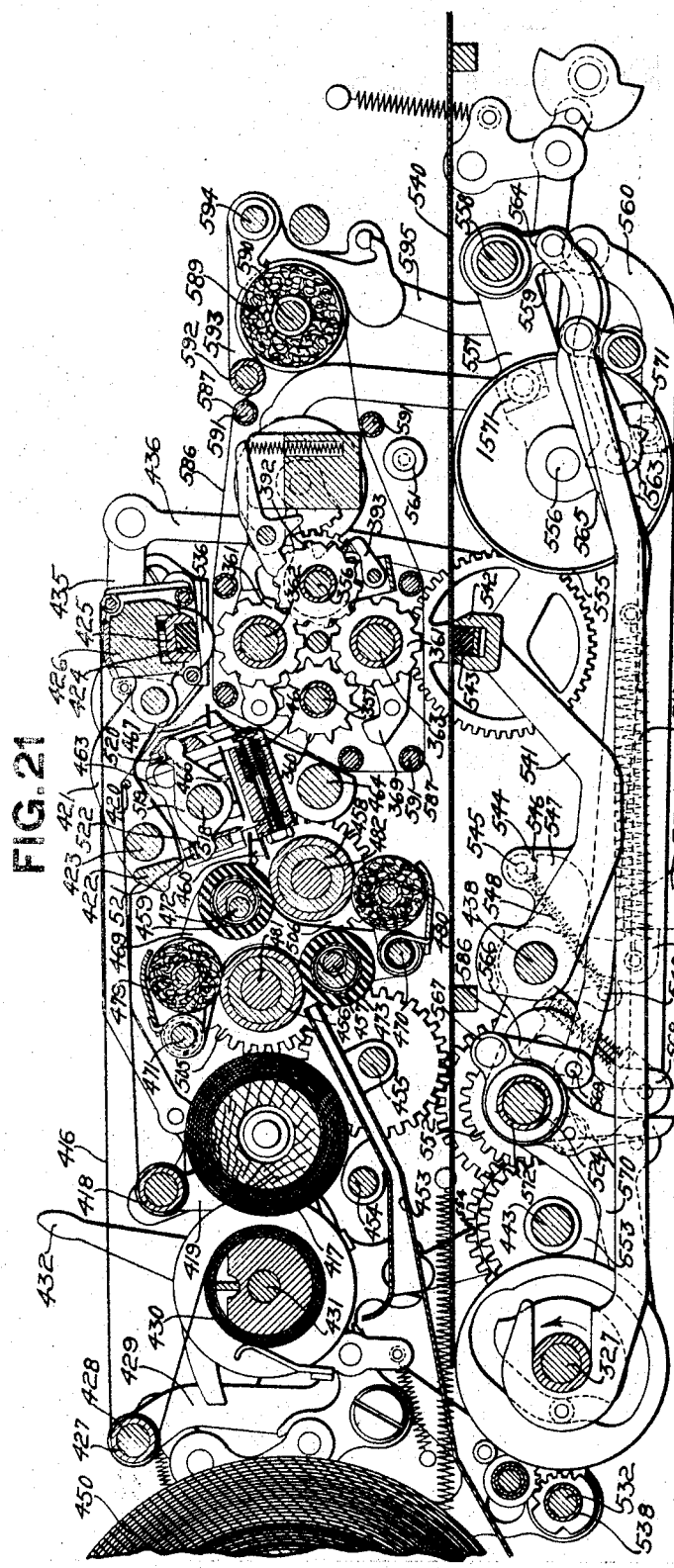
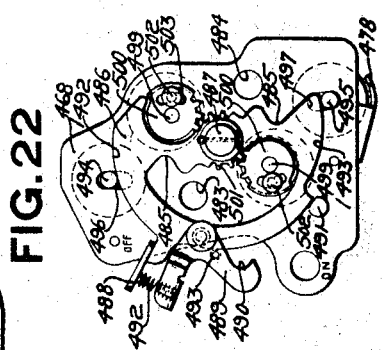
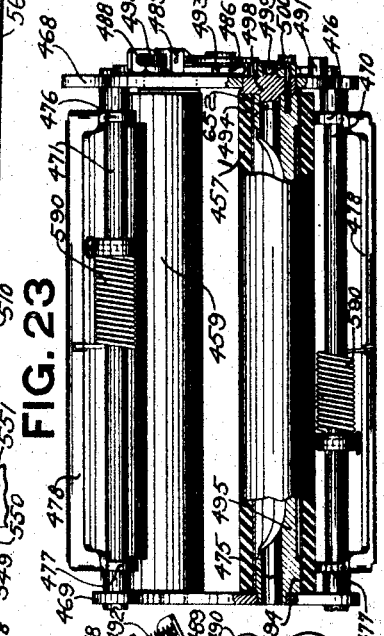
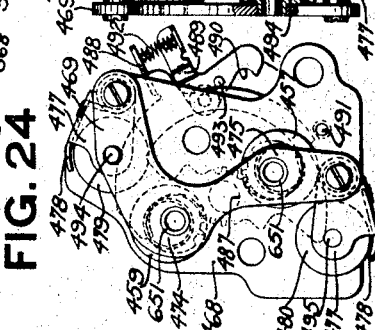
Inventor
Bernis M. Shipley
By Earl Benst
and Henry C. Stauffer
His Attorneys Jan. 12, 1932.  B. M. SHIPLEY  1,840,640
CASH REGISTER
Filed July 24, 1922   14 Sheets-Sheet 12
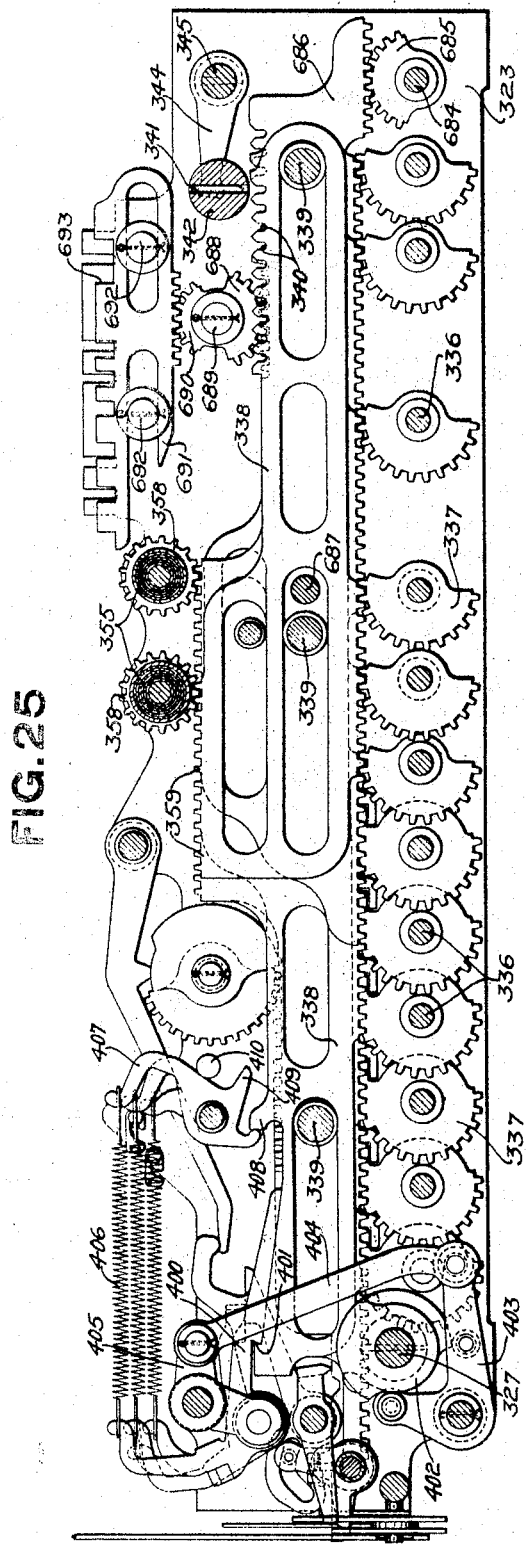
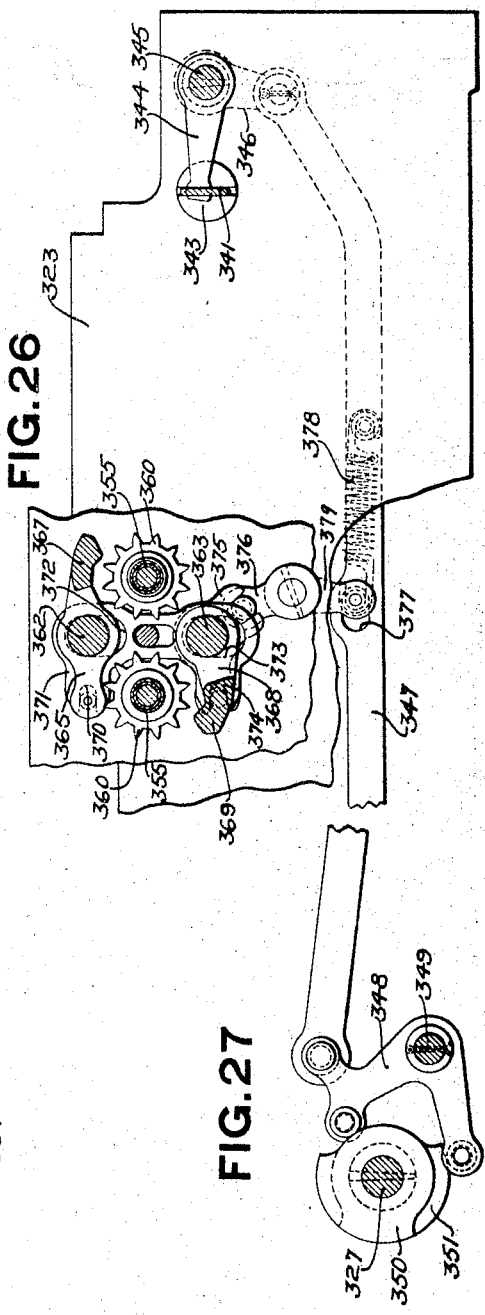
Inventor
Bernis M. Shipley
By Earl Beust
Henry E. Stauffer
His Attorneys

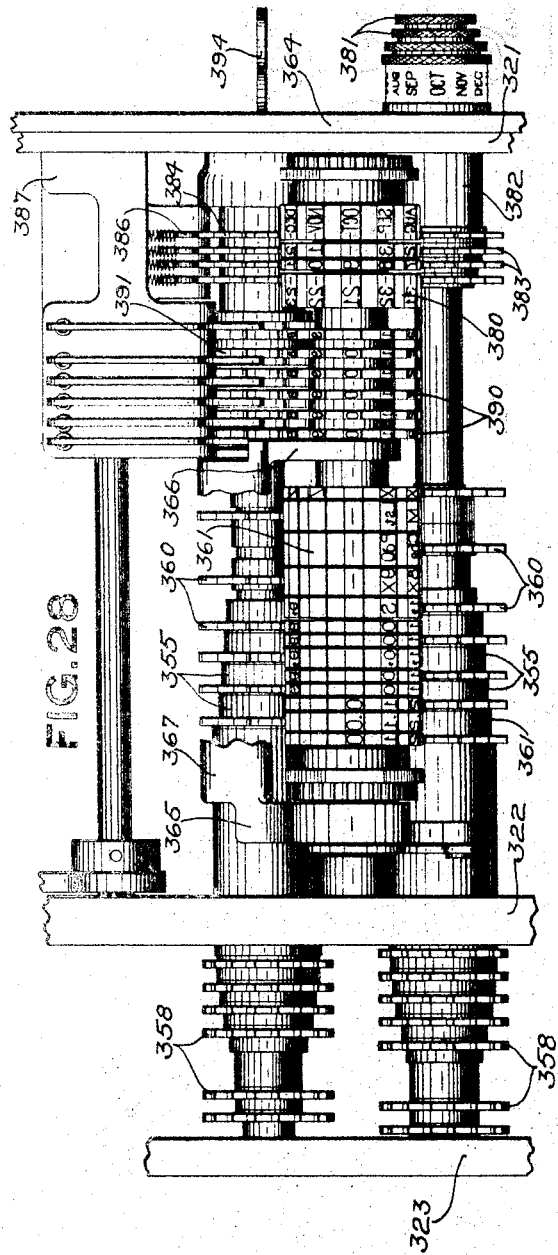
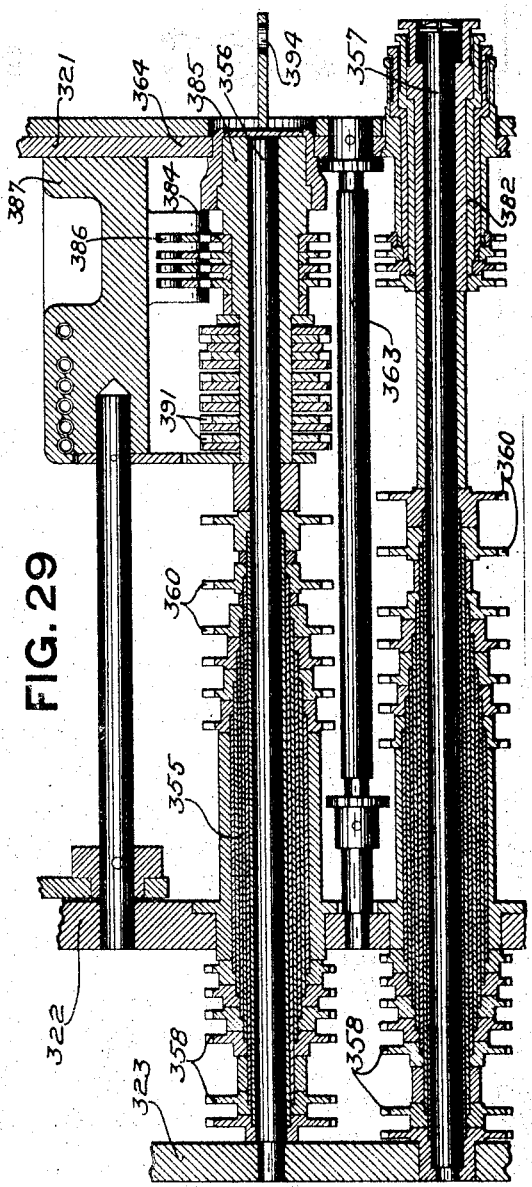

Jan. 12, 1932.        B. M. SHIPLEY                1,840,640
                      CASH REGISTER
                  Filed July 24, 1922        14 Sheets-Sheet 14

FIG.30

| OCT-20-21 | 00588 | LCh 5X S | 256.58 |
|---|---|---|---|
| Date | Trans.No. | Clk.Trans.Dept | Amount |

THE JAMES ROE CO.
DAYTON OHIO

THIS IS YOUR RECEIPT
THANK YOU

THE JAMES ROE COMPANY
FURNITURE OF QUALITY
DAYTON, OHIO.

FIG.31

| OCT-20-21 | 00569 | NCsh 3X | 27.50 |—516
|---|---|---|---|
| Date | Trans.No. | Clk.Trans.Dept | Amount |

THE JAMES ROE CO.
DAYTON OHIO

THIS IS YOUR RECEIPT
THANK YOU
OCT-20-21   00588   NCsh 3X      27.50 —517

THE JAMES ROE COMPANY
FURNITURE OF QUALITY
DAYTON, OHIO.

FIG.32

OCT-20-21   00588   LCh 5X S   256.58

OCT-20-21   00588   LCh
Date  Trans.No.  Clk.Trans.Dept  Amount
THE JAMES ROE CO.
DAYTON OHIO
NAME _____
ADDRESS 706 Western
CLERK  L      Am't Rec'D    Chg

FIG.33

THE JAMES ROE CO.
FURNITURE OF QUALITY

FIG.34

| 00584 | L st — — | 9999-999.99 |
| 00585 | B Csh 6X | 121.14 |
| 00586 | H V 9X | 3.40 |
| 00586 | Z L st Chr — | 1,374.56 |
| 00587 | A Mc 2X | 10.00 |
| 00588 | L Ch 5X S | 256.58 |
| 00588 | N Csh 3X | 27.50 |
| 00590 | E Ch 1X S | 56.50 |
| 00590 | XL st Chr — | 313.08 |
| 00591 | K R 7X | 20.00 |

—416

Inventor
Bernis M. Shipley
By
His Attorneys

Patented Jan. 12, 1932

1,840,640

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 24, 1922. Serial No. 576,925.

This invention relates to cash registers and the like and more particularly to machines of the type shown and described in Letters Patent of the United States No. 1,230,864, issued to W. A. Chryst on June 26, 1917, and Letters Patent of the United States Nos. 1,242,170 and 1,394,256, issued to F. L. Fuller on Oct. 9, 1917, and Oct. 18, 1921, respectively and in Letters Patent of the United States No. 1,619,796, issued to the present inventor, on March 1, 1927.

One object of this invention is to provide a machine of the general type shown herein with differentially adjustable levers for setting up the amount, kind of transaction, clerk's initial, etc., instead of banks of dedepressible keys as is usual in these machines.

Another object of this invention is to provide machines af this type with a special key for releasing the machine for operation.

Another object is to provide a device for removing the ink and impression rollers as a unit from the machine.

Another object is to enable the operator simultaneously to move the inking and impression rollers away from the type carrying rollers in order to insert the record strip between them previous to an operation of the machine.

With these and incidental objects in view, the invention consists in certain novel features of construction and combinations of parts, the essential elements of which are set forth in appended claims and a preferred form or embodiment of which is hereinafter described with reference to the drawings which accompany and form part of this specification.

Of said figures:

Fig. 1 is a perspective view of the machine embodying the present invention.

Fig. 2 is a left hand side elevation of the machine illustrating a part of the motor drive, a part of the automatic check controlling mechanism and a portion of the printing mechanism.

Fig. 3 is a sectional view of the machine taken alongside one of the amount banks.

Fig. 4 is a detail side elevation of the mechanism for returning the levers to their normal positions at the end of an operation.

Fig. 10 shows the mechanism for causing two revolutions of the driving mechanism during a totalizing operation. This view also shows the release or motor key and part of the mechanism cooperating therewith.

Fig. 11 is a detail sectional view taken on the line 11—11 of Fig. 10, looking in the direction of the arrows.

Fig. 12 is a view of one of the totalizer lines and the mechanism for sliding the totalizers thereon.

Fig. 13 is a detail sectional view taken on the line 13—13 of Fig. 12.

Fig. 14 is a detail view of part of the mechanism for releasing the machine.

Fig. 15 is a view looking toward the left and illustrates the driving connections from the main shaft to the printer shaft and also the mechanism for permitting only one revolution of the printer shaft while the main shaft makes two revolutions during totalizing operations.

Fig. 16 is a detail view of the driving and retaining pawls for the printer drive shaft and shows their connection with said shaft.

Fig. 17 is a view of the total lever and the plate for controlling the totalizers on total taking operations. Part of the mechanism for releasing the machine is also shown in this figure.

Fig. 18 is a front view of the printing mechanism with part of the check roll broken away.

Fig. 19 is a detail view of the upper impression operating mechanism.

Fig. 20 is a detail view of the operating mechanism for the check perforator and the check impressions.

Fig. 21 is a section taken through the printing mechanism.

Fig. 22 is a detail end view of the removable carriage which contains the inking and impression rollers, and shows the mechanism for moving these rollers away from the electro roller to permit easy passage of the check strip between them. The mechanism is shown in its moved position herein.

Fig. 23 is a left side view of the mechanism shown in Fig. 22.

Fig. 24 is a rear view of the mechanism of Fig. 22.

Fig. 25 is a section through the printer mechanism showing the racks for setting the type wheels.

Fig. 26 is a sectional view partly broken away showing the type wheel aliners and the type wheel rack aliners.

Fig. 27 is a detail view of the type wheel rack aliner operating mechanism.

Fig. 28 is a top plan view of the type wheel line and the associated tube lines for operating the same.

Fig. 29 is a horizontal sectional view through the centers of the tube lines.

Fig. 30 is a view of the single check issued by the machine.

Fig. 31 is a view of the stub check having two impressions thereon printed by the machine.

Fig. 32 is a view of the type of slip with its duplicate adapted to be used with the present machine.

Fig. 33 is a view of the back of the stub check shown in Fig. 31, and shows the space for any desired advertising matter.

Fig. 34 is a fragmentary view of the detail strip printed by this machine.

IN GENERAL

Figure 5:
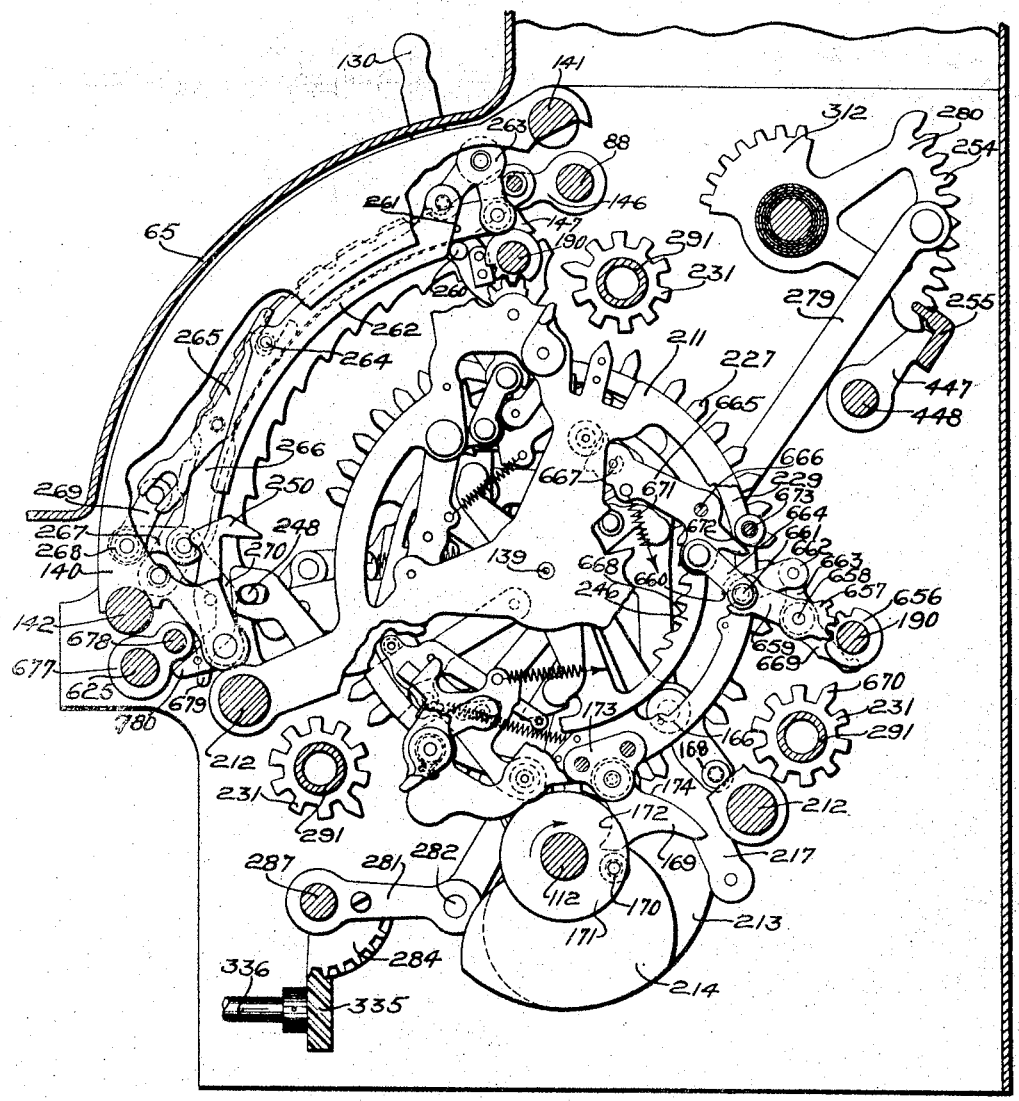
Fig. 5 is a section through the machine taken alongside one of the amount banks but looking in the opposite direction from that in Fig. 3.

The machine in which the present invention is embodied is of the type known in the art as "lever-set". Instead of push-in keys such as are generally employed in a machine of the general class in which this machine belongs, there are provided a series of levers operating in vertical leverways in the front of the machine. There is one lever for each denomination of an amount to be set up, the machine being capable of entering $999.99 at one operation. It is of course understood that this registering capacity can be either increased or decreased without in any way departing from the spirit of the invention. One lever is provided to select the department totalizer to be operated and to control the setting up of the appropriate indicators and type wheels. Likewise, levers are provided for the clerks and transaction banks.

The usual total lever for controlling the machine in total and sub-total operations, which is common in machines of this type, is used herein.

At the extreme right of the machine is a single key which is used to release the machine for operation.

The entire machine is enclosed in a suitable cabinet 65 of the usual design.

*Operating mechanism.*—The motor used to operate the present machine is of the well known type illustrated and described in Letters Patent of the United States No. 1,144,418, granted to Charles F. Kettering and William A. Chryst on June 29, 1915. For a detailed description of the same, reference may be had to that patent. Only a part of the motor frame, the motor switch and a part of the clutch mechanism for the motor are shown in the accompanying drawings.

The motor is carried by a frame 75 (Fig. 2) mounted on the left side frame 76. A clutch shell 77 forming one part of the clutch device, and shown in section is rotated through means (not shown) operated by the motor. A clutch disk 78 is located inside of the clutch shell 77 and is fast on a sleeve 106 supported by a stud 107 mounted in the machine frame. The disk 78 cooperates with rollers 79 carried by a disk 80 loose on sleeve 106 and is connected thereby to the clutch shell 77 upon release of the machine, as fully shown and described in the aforesaid Kettering and Chryst patent. A disk similar to disk 80 and located directly behind it in Fig. 2, is fast on sleeve 106, acts as a rigid stop for the machine. Both disks have shoulders 81 engaged by the forked end of a lever 82 mounted on a stud 83 on the frame 76. An arm 84 of lever 82 carries a roller 85 which normally rests upon the curved edge 86 of a lever 87 fastened on a shaft 88 which extends across the entire machine.

When the lever 87 is rocked counter-clockwise to release the machine, as will be hereinafter described, the lever 82 is rocked counter-clockwise out of engagement with the shoulders 81 by a spring 95. Counter-clockwise movement of the lever 82 is limited by a stud 96 on the frame 76. Upon release of the lever 82 a cam disk forming part of the clutch (not shown) is moved by spring action, as fully described in the above mentioned Kettering and Chryst patent. The movement of this cam disk rocks a lever 97, pivotally mounted on frame 76, in a clockwise direction. The upper end of the lever 97 engages a roller 98 carried by a lever 99 pivoted at 100 to the main frame and rocks said lever clockwise, whereupon an insulated portion of said lever moves a contact spring 102 into engagement with a contact point 103, thereby closing the circuit through the motor. A gear 108 is fast on the sleeve 106 and through a gear 109 drives a gear 111 fast on a cam shaft 112 mounted in the frames of the machine. Through this gearing the cam shaft 112 is rotated once at each operation of the machine.

For the purpose of restoring the lever 82 to locking position near the end of the operation of the machine a link 113 is pivoted at 114 to said lever. The gear 109 carries a pin 115 which near the end of an operation of the machine engages a curved portion 116 of the link 113 and raises the link, thereby moves the lever 82 clockwise to its normal position.

The lever 87 is rocked clockwise to normal position just before the pin 115 passes out of engagement with the link 113 in order to retain the lever 82 in its normal position.

The means for rocking the shaft 88 clockwise (Figs. 10 and 17) to release the motor clutch mechanism, previously described, includes a lever 160 (Fig. 10) fast on said shaft. The lever 160 carries a screw stud 161 upon which are pivoted two spring clips 162 the lower ends of which are surrounded by a coil spring 163 compressed between shoulders on the spring clips 162 and the end of a slot 176 in a link 177 also surrounding the stud 161. From this it can be seen that as soon as the arm 197 is released from the stud 198 by the depression of the release key 180 (as will be hereinafter described) the spring 163 will rock the lever 160 and consequently the shaft 88 clockwise (Figs. 10 and 17). This movement is limited by a projection 178 on the lever 160 contacting with a stud 179 on the right hand side frame.

The means for restoring the shaft 88 to its normal position is as follows: Pivoted on a stud 117 is a lever 118 carrying a pin 209 projecting into an opening 221 in the link 177. The lever 118 carries an anti-friction roller 222 projecting into a cam groove 223 in the gear 123. It will be remembered this this gear receives one-half a rotation at every adding operation of the machine. Therefore there are two nodes 224 in the groove 223. The pin 209 normally rests on a shoulder 253. Near the end of the half rotation of the gear 123 one of the nodes 224 through the roller 222 rocks the lever 118 clockwise and the pin 209 moves the link 177 downwardly in the direction of its length whereby the upper part of the slot 176 engages the stud 161 and rocks the lever 160 and shaft 88 first counter clockwise past normal position and then clockwise to normal position, in which position the pawl 197 (Fig. 14) is again in contact with the flat stud 198 on lever 199 and thereby maintains the shaft 88 in its normal position.

It may sometimes be necessary to operate the machine by hand instead of using the motor. For this reason there is provided a crank handle 120 (Fig. 10) removably mounted on a stud in the right hand side frame of the machine. Integral with the crank 120 is a sleeve 121 connected to a gear 122 meshing with a gear 123 mounted on a stud 124 projecting from the right hand side frame. The gear 123 meshes with a gear 125 fast on the shaft 112. The ratio of the gears 122, 123 and 125 is such that two rotations of the gear 122 will give one rotation to gear 125 and consequently the shaft 112.

*Operating levers.*—For illustrative purposes let it be assumed that the machine described herein is being used in a department store wherein it is desirable to make a record of the amount of the sale, a record of the department in which the sale is made, a record of the particular kind of sale or transaction and a record of the clerk who registers said transaction.

The operating levers will now be described as being adapted for use in a store wherein the above system is in use. There are five amount levers 130, one lever 131 to set up the proper department 1X to 9X; one lever 132 which is adapted to set up various transactions, both regular and special; a lever 134 having eight positions for registering clerks and one position bearing the word "List", in which position this lever is placed when it is desired to enable the operator to add a plurality of unrelated items. There is also a total lever 137 of well known form for controlling the operation of the machine in total and sub-total taking operations.

The amount and transaction levers are loose on sleeves 220 (Figs. 3, 4 and 9), supported by plates 210 of their respective differential units. A rod 139 extending through all of these sleeves is secured in the right hand frame of the machine. The levers project outward through the cabinet 65 and are guided by frames 140 supported at their upper and lower ends respectively by rods 141 and 142. The levers are normally in their uppermost or zero positions and are moved down for the purpose of setting them.

Figure 7:
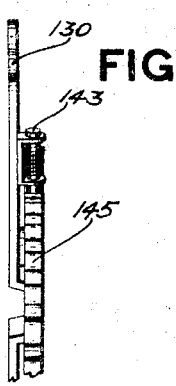
Fig. 7 is a detail front view of one of the amount setting levers.
Figure 8:
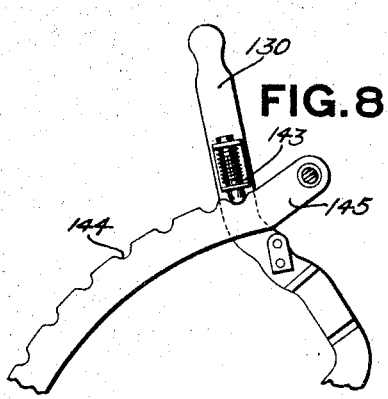
Fig. 8 is a detail side view of the mechanism shown in Fig. 7.

A spring-pressed pin 143 (Figs. 7 and 8) carried by each lever is adapted to cooperate with a series of depressions 144 in a bar 145 carried by frames 140 to hold the levers flexibly in any one of their positions. Means is also provided for positively locking a lever in its selected position when the machine is released for operation. When the release key is depressed the shaft 88 is given a counter-clockwise movement (Fig. 3). Fast on this shaft are a plurality of short arms 146, one for each lever. At their ends these arms each carry a pin cooperating with a slot in an arm 147 pivotally mounted on the frame 140. Pivoted to arm 147 is one end of a curved plate 148, the other end of which is pivoted to an arm 149 mounted on frame 140. Another plate 151 beside each plate 148 is carried by studs 152 and 153 mounted in the frame 140 and projecting through concentric slots in plate 148 and through angular slots 158 in plate 151. Also mounted on plate 148 are two rollers 154 and 155 projecting into slots 156 and 157 respectively in plate 151. It can be seen from the above that when the shaft 88 is rocked counter-clockwise (Fig. 3) the plate 148 will be raised due to its slot and pin connection therewith. This movement of the plate 148 through rollers 154 and 155 cooperating with slots 156 and 157 forces the plate 151 inwardly to the extent and in the direction of the slots 158 in plate 151. This inward movement brings one of the semi-circular depressions 150 over a stud 159 projecting from each lever, and locks said lever against movement during the operation of the machine.

The means for returning the levers to their normal positions at the end of the operation will now be described. Integral with the hub portion of each lever is a segment gear 164 (Fig. 4), meshing with a segment gear 165 rotatably mounted on a stud 166 in the frame of the differential mechanism. The segment gear 165 has a downwardly extending tail 167 carrying a roller 168 adapted to cooperate with a cam lever 169 pivoted to a plate 173 (Fig. 5) which is riveted to the frame 211 of one of the differential units to be later described. This cam lever 169 also cooperates with a roller 170 carried by a disk 171 fast on shaft 112. It will be remembered that this shaft is given one rotation at each operation of the machine and the roller 170 is so placed on disk 171 that near the end of the operation it will strike the curved surface 172 of the cam lever 169 and rock the said cam lever clockwise (Fig. 4). This movement of the cam lever 169 brings the curved surface 174 in contact with roller 168 and by this means rocks the segment 165 clockwise, the segment 164 meshing therewith counter-clockwise, and the lever upward to its normal position.

*Control or motor key.*—A control key or motor bar 180 (Figs. 1 and 10) is provided for releasing the machine for operation and closing the motor switch when a motor is used. The key itself is detachable from the machine so that it is possible for the proprietor to remove the key and thereby prevent operation of the machine until the same is replaced. The shank 181 of the key has a long slot 182 cut therein which fits over two screws 183 carried by a slide 184. The slide 184 is slidably mounted on two screws 185 and 186 which project through slots in the slide and are fast in the side frame of the machine. The slide 184 carries a pin 187 (Figs. 10 and 17) which passes through a slot in one end of a two-armed lever 188 pivoted on the crank handle stud 119. The opposite end of lever 188 carries a pin cooperating with a slot in the end of an arm 189 loosely mounted on a shaft 190 carried by the machine frames. The arm 189 is connected to a hook-shaped cam arm 191 by means of a yoke 192. The inner curved surface of the cam arm 191 cooperates with a pin in the lower end of a depending arm 193 pivoted on the release shaft 88 (Fig. 17). The arm 193 is made integral with a segment 194 by means of a yoke 195. Segment 194 has gear teeth formed on its lower end which engage similar teeth carried by a sleeve 196 surrounding shaft 190. Integral with the sleeve 196 is a release pawl 197 (Fig. 14) having a flattened end abutting against the flat side of a half-round stud 198 carried by an arm 199 depending from a sleeve (not shown) surrounding shaft 88. This sleeve also has projecting therefrom a lug 200 the lower side of which is flattened and engages a pin 201 carried by an arm 202 fast on shaft 88. This shaft 88 is adapted to be rocked clockwise (Fig. 14) under the influence of the spring 163, before mentioned but this rocking movement for unlocking the machine and closing the motor switch cannot take place until the release key is depressed. When this is done the lever 188 is rocked counter-clockwise (Fig. 17) thereby rocking arm 189 and cam arm 191 clockwise. The inner curved surface of cam arm 191 rocks arm 193 and through yoke 195 the segment 194 clockwise. This movement, through the gear teeth thereon, rocks sleeve 196 and its integral release pawl 197 counter-clockwise, thereby permitting the half-round stud carried by arm 199 to pass beneath the release pawl 197. As the lug 200 is integral with the arm 199 it will be raised and permit the arm 202 and shaft 88 to be rocked, as before mentioned, to release the machine.

Near the end of the operation of the machine the shaft 88 is returned to its normal position, thereby moving arm 202 and stud 201 counter-clockwise. Stud 201 contacts with a cam surface 205 of a restoring pawl 206 loose on shaft 190 and rocks said pawl counter-clockwise (Fig. 14). The pawl 206 has another cam surface 207 which contacts with the stud 198 and when said pawl 206 is rocked it moves the arm 190 counter-clockwise far enough for a spring 208 attached to release pawl 197 to rock said projection in behind the flattened portion of stud 198 and thereby hold it in its normal position.

*Differential mechanism.*—The differential mechanism of the machine is employed to differentially operate the different totalizers and to select them for operation and also to set type carriers in the printing mechanism as controlled by the banks of amount levers and the banks of control levers. The amount differential mechanism will be described first.

Figure 9:
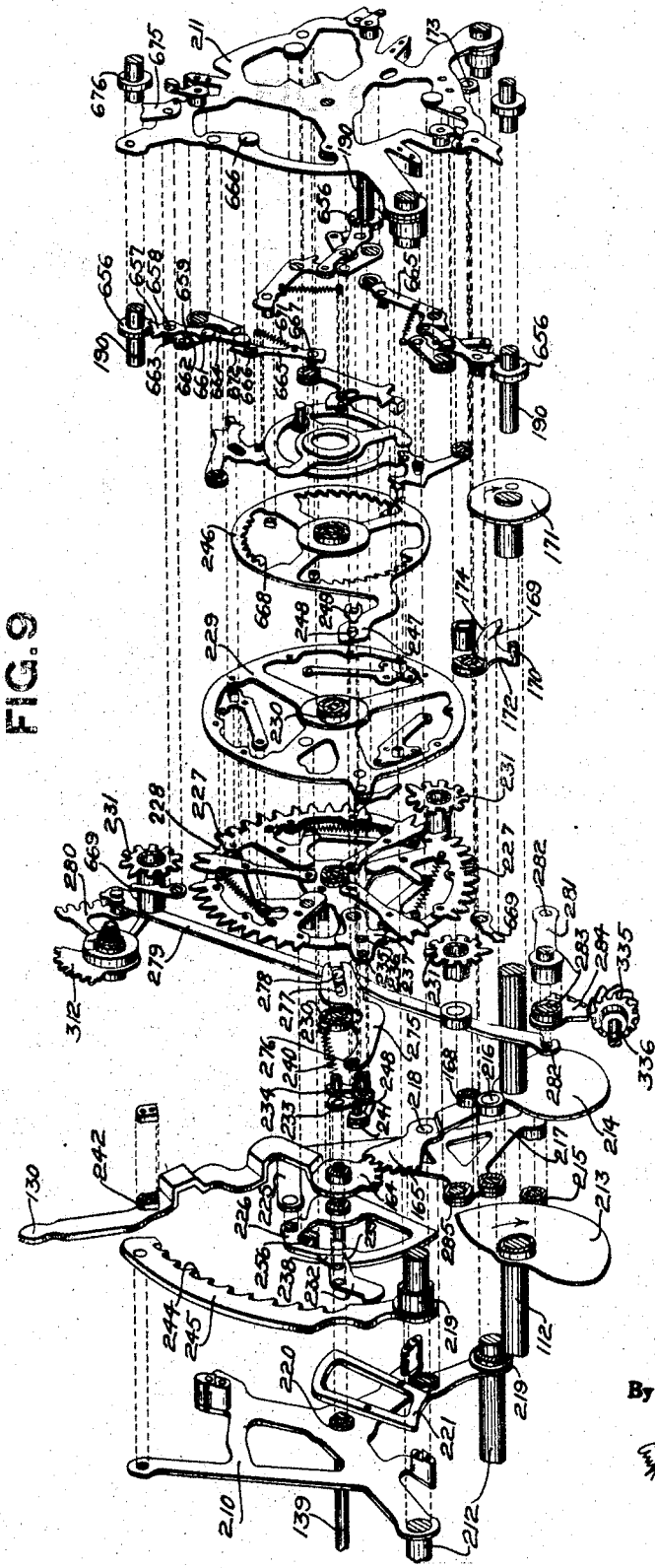
Fig. 9 is a disunited perspective view illustrating one unit of the amount differential mechanism.

There is a differential unit for each of the five amount levers and four extra units of higher denomination which are operated in adding operations when it is necessary to transfer to them. Figure 9 is a disunited perspective view of one of these differential units. Each unit is supported by hangers 210 and 211 mounted on the rods 212. A rod 139 extends through the center of the differential units, including the transaction, department and clerks' units and acts as a stabilizer for the said units.

Each differential unit is driven by a pair of cams 213 and 214 fast on shaft 112. Said cams cooperate with rollers 215 and 216 on a Y-shaped lever 217 pivoted on a stud 218 on the hanger 210. Sleeves 219 on rods 212, and the sleeve 220 on the rod 139, are secured in the hanger 210 and serve to properly space the hangers 210 and 211. A spacer 221 secured to the hanger 210 spaces the lever 217 from the plate 210. The pairs of cams 213 and 214 are arranged spirally on the shaft 112, that is, the units cams are set slightly ahead of the tens cams and the tens cams set slightly ahead of the hundreds cams, etc. This arrangement of cams as illustrated in the above mentioned Chryst Patent No. 1,230,864 and is for the purpose of making the transfer mechanism positively operated and also to render the machine easier in its operation.

To the upper end of the lever 217 is pivoted a link 225 pivoted to a driving segment 226 loose on the sleeve 220. Clockwise movement of the cams 213 and 214 (Fig. 9) oscillates the lever 217 first clockwise and then counter-clockwise to normal position. This movement, through the link 225 rocks the driving segments 226 first clockwise and then counter-clockwise to normal position. As viewed in Fig. 3, this movement is first counter-clockwise and then clockwise.

There are three differentially movable segments 227 mounted between two disks 228 and 229 having fast thereto a hub 230 loose on the sleeve 220. The segments 227 operate totalizer pinions 231 of the upper, front and back totalizer lines to be hereinafter described. The segments 227, and disks 228 and 229 are secured together so that they move as a unit. The differentially movable disks 228 and 229 are connected to the invariably moved driving segments 226 by a latch 232 carried by bell cranks 233 and a link 234 pivoted at 235 and 236 respectively to the disks 228 and 229, and a block 237 secured between the two disks. A foot 238 of the latch 232 is normally held in engagement with the segment 226 above a shoulder 239 by a spring 240 stretched between the upper end of the arm 234 and a pin carried by the disks 228 and 229. By this latch connection the disks 228 and 229 and segments 227 are rotated clockwise (Fig. 9), and counter-clockwise (Fig. 3), until an arm 241 integral with the bell crank 233 strikes a lug 242 riveted to the side of each setting lever. When this occurs the bell cranks, 233 and link 234 are rotated clockwise (Fig. 3) or counter-clockwise (Fig. 9), thereby disengaging the foot 238 from the shoulder 239. When this has taken place the foot 238 rides upon the outer periphery of the segment 226 as said segment continues its invariable movement. When the latch is thus disconnected a forward end thereof engages one of a plurality of notches 244 in a segmental locking plate 245 mounted on the sleeve 219 on the rod 212 and riveted to the hanger 210, the notch engaged corresponding with the position of the lug 242 carried by its lever. There are ten notches in the plate 245, one for each of the nine amount and one zero positions of said lever. When there is no amount lever set the latch is disconnected in the zero position. Adjacent the disk 229 and loose on the hub 230 is a reset spider 246 having integral therewith an arm 247. This arm surrounds a shouldered stud 248 carried by the bell crank 233. A clip 249 in a groove (not shown) in the stud 248 holds the arm 247 in proper lateral position. The arm 247 is in the plane of a zero stop pawl 250 and when there is no setting lever moved the upper edge of arm 247 strikes the zero stop pawl 250 (Figs. 3 and 5), whereby the bell crank 233 and link are rocked to disengage the latch 232 from the driving segment 226. If an amount lever is moved the zero stop pawl 250 is moved out of its normal position, so that the latch will not be disengaged at zero. The means for accomplishing this will now be described.

Each amount lever 130 carries a pin 260 (Fig. 5) which cooperates with a cam surface 261 of a curved link 262 pivoted to one arm of a bell crank 263. The link 262 also carries a pin 264 projecting through a slot in one arm of a two-armed lever 265, pivoted on a curved bar 266 supported at its upper end by the other arm of the above mentioned bell crank 263 and at its lower end by an arm 267 fast on a sleeve 268 supported by a stud in the frame 140. Also fast on sleeve 268 is an arm 269 which has a pin projecting through a slot in the downwardly extending arm of the two-armed lever 265. It can be seen that when a lever 130 is moved the pin 260 through cam surface 261 rocks the link 262 clockwise about the arm of bell crank 263 to which it is attached. This movement rocks the two-armed lever 265 counter-clockwise (Fig. 5) and through the slot and pin connection rocks arm 269, sleeve 268 and arm 267 clockwise. As arm 267 is pivoted to the lower end of the curved bar 266, this bar will be lowered and the bell crank 263 carrying the link 262 will be rocked clockwise, thereby moving the pivotal point of link 262 outwardly and giving to the link 262 a parallel movement when actuated by pin 260. The arm 267 has a depending tail 270 cooperating with a pin projecting from the zero stop pawl 250. When arm 267 is rocked clockwise, as above described, the tail 270 will engage the said pin and rock the zero stop pawl on its pivot far enough to permit the latch 232 to pass by on its upward movement.

When the segment 226 is rocked counterclockwise (Fig. 9) it engages a pin 256 carried by the disks 228 and 229 and restores said plates to their normal positions during which time the segments 227 add upon the totalizer pinions 231. The time at which the segment 226 engages the pin 256 may vary according to the position to which the lever has been moved. In other words, if the lever is moved to the "2" position the segment 226 does not engage the pin 256 until near the end of its movement. However, if the lever is moved to the "9" position and the latch disengaged at 9 the pin 256 is engaged immediately upon the return movement of the segment 226, thereby causing a greater rotation of the corresponding totalizer pinion 231. The totalizer pinions are rocked into engagement with the segment 227 after the latches 232 have been connected in adding operations so that as the segments 227 are returned to their normal positions the amounts as determined by the position at which the lever has been moved, are accumulated on said pinions.

Mechanism is provided herein for transferring from lower to higher denominations when this becomes necessary. No description of this mechanism, however, will be included herein, as it is old and well known in connection with machines of this type. A detailed description of this mechanism and its operation is given in the previously mentioned Shipley patent, No. 1,619,796, and also in U. S. Letters Patent No. 1,242,170, granted to F. L Fuller, and reference is hereby made thereto.

The differentially movable disks 228 and 229 and the segments 227 are also hereinafter described in connection with the total and sub-total taking operation.

Associated with the differential mechanism is a beam 275 (Figs. 3 and 9) pivoted on a stud 276 carried by the disks 228 and 229. The beam 275 has a slot 277 surrounding a pin 278 on a link 279 pivoted to a segment 280 to be hereinafter described in connection with the indicating mechanism. Said link 279 is connected at its lower end by means of a pin 282 to an arm 281 loose on a rod 283 mounted in the machine frames. Secured to the arm 281 is a spiral segment 284 the function of which will be hereinafter described in connection with the printing mechanism.

From the above description it can be seen that the end of the beam 275 which is pivoted on stud 276 is differentially positioned when the disks 228 and 229 are differentially set under the control of the levers 130.

As previously described, the levers 217, through the link 225 and the segment 226, drive the disks 228 and 229 until the latch 232 is disconnected by a lever 130. The lever 217 carries a roller 285 which upon the counterclockwise movement (Fig. 3) of the lever engages the lower edge of the beam 275 near the center thereof and rocks said beam about the stud 276 until a surface 286 (Fig. 3) of said beam engages the periphery of the hub 230 which extends through the disks 228 and 229. During this movement of the beam, the link 279 is moved and thereby positions the segment 280 and the arm 281 to differentially position the indicating and printing mechanism respectively in accordance with the positioning of the differentially movable disks 228 and 229, as controlled by the amount levers.

Figure 6:
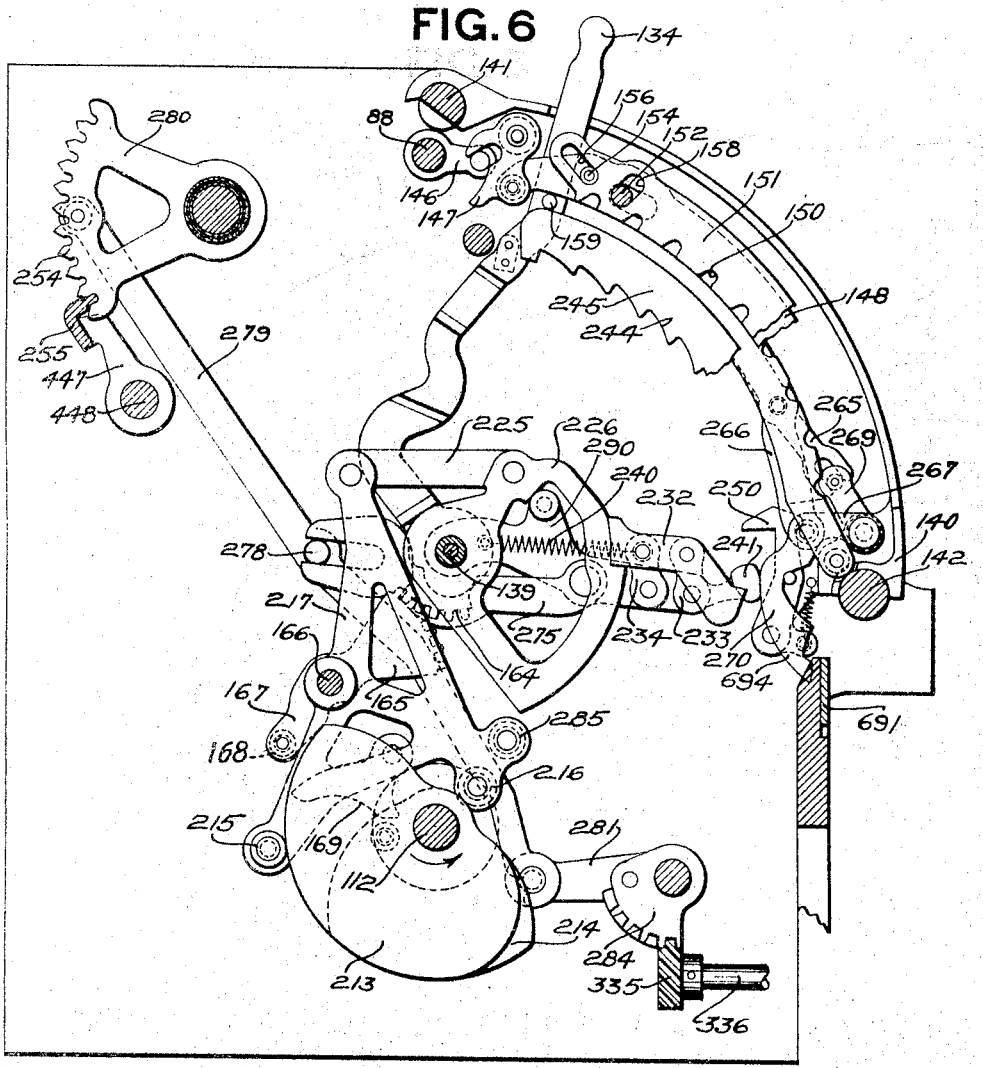
Fig. 6 is a detail side elevation of the setting lever for the "clerks'" bank and the mechanism cooperating therewith, together with one of the totalizer actuating segments and its driving means.

*Differential mechanism—clerk's.*—The differential mechanism which cooperates with the clerk's lever 134 (Fig. 6), is similar to that used with the amount levers except that the differentially movable segments 227, and disks 228, 229 are omitted and are replaced by an arm 290 (Fig. 6) loose on the sleeve 220 for this unit. The arm 290 carries a latch device including the bell crank 233, link 234 and arm 241, a latch 232, and a spring 240, and is identical with that described in connection with the amount differential mechanism. This latch device connects the arm 290 to a segment 226 identical with the segment 226 associated with the amount differential mechanism.

The segment 226 for this bank is driven by a mechanism identically the same as that which drives the segments associated with the amount differential mechanism, and which includes the link 225, the lever 217 carrying rollers 215 and 216 cooperating with cams 213 and 214 fast on the shaft 112.

To the arm 290 is pivoted the usual beam 275, bifurcated to surround the pin 278 on the link 279 associated with the clerk's bank. This link is connected to the segment 280 of the indicating mechanism associated with the clerk's lever and to the arm 281 rigid with the spiral segment 284 associated with the clerk's lever.

Differential mechanism associated with the department lever 131 and the transaction lever 132 is practically the same as that just described in connection with the clerk's lever 134. Therefore, it is not thought necessary to again either illustrate or describe this mechanism.

*Totalizers.*—In the present machine three totalizer lines are provided and mechanism for shifting the totalizer lines to select various totalizers is also provided, as is well known in the art. In addition, a totalizer line selecting mechanism is provided with means for preventing or permitting, as desired, one, two or all three of the totalizer lines to be rocked into engagement with the differential mechanism simultaneously. Due to this construction totalizer controlling levers may be moved either singly or in combination, but only one totalizer on each line can be selected thereby to accumulate the amount. As an additional result, a plurality of totalizer selecting levers may be moved and their particular department or transaction indicated and printed while the amount will be accumulated on but one of the totalizers if such result is desired. Then again two totalizer controlling levers may be moved and the amount accumulated on one, two or three totalizer lines, this result being attained as before described by the totalizer line selecting mechanism which automatically determines which or how many of the totalizer lines are to be rocked into engagement with the differential mechanism.

A semi-diagrammatic view of one of the three totalizer lines, each carrying a plurality of totalizers is shown in Fig. 12, and their relation to the remainder of the machine is well shown in Fig. 3. Only a general description of the totalizers will be given herein, as both a very full illustration and description of these devices is given in Letters Patent of the United States issued to W. A. Chryst, No. 1,230,864, dated June 26, 1917. In the present case it is believed to be sufficient to state that each totalizer line consists of a plurality of department or individual totalizers 231 loosely mounted on a tube 291 fixed in frames 292, one arranged at each end of the tube. These frames are secured to said tube and slide on a shaft 293 which has arms 294 carrying rollers 295 cooperating with slots 296 in cam plates 297 fast to the machine side frames. The arm 294 on shaft 293 is provided with a link 298 (Fig. 13) which is operated to rock the totalizer wheels 231 into and out of mesh with the differential mechanism. Rocking movement of the shaft 293 through a pair of cams 299 (Figs. 3 and 12) controls the operation of the alining device 300 for the totalizers, the same as the alining device illustrated and described in the before mentioned Chryst patent.

Each totalizer of the individual totalizers consists of one pinion in each group of pinions, and therefore of the first pinion of each group is engaged with the differential actuators 227 a certain individual totalizer will be operated; if the second pinion of each group is engaged with the actuators a different totalizer will be operated, etc. This construction is described in U. S. Letters Patent No. 1,109,763, granted Sept. 8, 1914, to Charles F. Kettering, and is known in the art as "interspersed" totalizers.

To shift each movable totalizer line along shaft 293 so that any desired totalizer may be brought opposite the actuators, the totalizer frame is provided with a boss 301 in which is secured a rod 302 (Fig. 12) provided with a roller 303 loose on the rod which extends into a groove 304 in a spiral drum cam 305. There are three cams 305 illustrated in Fig. 12, each one of which cooperates with the respective roller 303 of its associated totalizer line. Each of the cams 305 is journaled on a rod 306 and has a rearwardly extending arm 307 to which is pivoted a link 308 connecting it with either a tube 309 or a shaft 310 which receives its movement from the beam 275 through link 279 set by either the department, transaction, or clerks' levers, as has been previously described. By this means, through the link 308 and cam 305 the totalizer line associated with each of the levers just mentioned is slid to bring the individual totalizer into a position corresponding with the position to which its appropriate transaction lever has been moved, so that it may be actuated by the differential mechanism when it is rocked into engagement therewith. It will be remembered that the links 298 are operated to engage the totalizers with the differential actuators. These links 298 (Figs. 12 and 13) are pivoted to arms 294 fast on a shaft 293 and therefore when the totalizer elements are moved into engagement with the differential actuators the shaft 293 will be rocked in a clockwise direction (Fig. 13). The tube 291 which carries the totalizer elements has mounted in its right hand end (Fig. 12) an aligner 287 provided with eleven circumferential grooves 288. Fast on shaft 293 is an arm 289 having at its end two teeth which, when the shaft 293 is rotated on totalizer engaging movements, will engage with and project into the grooves 288 in the aliner 287 and thereby aline the totalizer elements in their engaged position and prevent any lateral movement of the tube 291. When the totalizer elements are disengaged from the actuating segments the arm 289 is rocked counter-clockwise (Fig. 13) to disengage its teeth from the grooves 288.

The mechanism for controlling the engagement of the totalizers is not shown herein, nor will it be described, as it forms no part of the present invention. Description of this mechanism can be found in U. S. Letters Patent No. 1,242,170, issued to F. L. Fuller, and also in No. 1,394,256, granted to the same inventor.

*Indicators.*—The indicating mechanism of the present machine will not be described in detail herein. It is thoroughly illustrated and described in Letters Patent of the United States No. 1,163,748, granted December 14, 1915, to F. L. Fuller, and in the previously mentioned Shipley Patent No. 1,619,796, and reference is hereby made thereto.

It will be remembered that the link 279

(Fig. 3) appropriate to each lever 130 is pivoted to segment 280, and is moved differentially under the control of beam 275. Integral with segment 280 is a segment 312 having teeth meshing with a rack portion 313 of one of a plurality of indicator supporting carriages 314. Each carriage 314 is slidably mounted on rollers 315 supported by shafts 316 mounted in side auxiliary frames 317 screwed to the machine side frames. Each carriage 314 carries a plurality of vertically slidable indicator tablets 318, ten for indicating in the front and ten for indicating in the back of the machine. It can be seen that through beam 275, link 279 and segment 312 the carriage 314 will be moved differentially under the control of the differential mechanism to bring the proper indicator tablet 318 to a position from which it can be exposed.

The mechanism for exposing the selected indicator tablets to view through openings 319 in the cabinet 65 consists of two lifter bars 411 running across the front and back of the machine and carried by end plates 412 thus forming a cage adapted to be lowered and raised at each operation by links 413. The tops of the indicator tablets 318 are formed with a loop 414, and just beneath this on each side of the tablet are recesses adapted to cooperate with depending T-shaped arms carried by the front and back lifter bars 411.

At the beginning of an operation the bars 411 are first lowered to replace the tablets, used in the previous transaction, in their respective carriages 314. The carriage is then moved differentially to position the new indicator tablet and then the bars 411 are raised in order to expose the newly selected indicators to view. Guideways are provided to guide the tablets in their vertical movements.

Mechanism is provided for alining the indicator carriages so that the selected tablets may be directly beneath the guideways when they are elevated. The segment 280 to which link 279 is pivoted has teeth 254 which are adapted to be engaged by an alining yoke 255 supported by arms 447 fast on shaft 448. This shaft is rocked first counter-clockwise and then clockwise (Fig. 3) by means not shown herein in order to permit movement of the carriage for selecting the indicator and then alining and locking the carriage in its moved position.

Another alining means consists of a right angled bar 449 which runs across the machine just above the carriage 314 and is adapted to cooperate with teeth 507 formed in the upper edge of an aligning rack 508 supported by each of the indicator carriages 314. This bar 449 is supported by arms 509 pivoted at 787 to the indicator side frame 317. Also pivoted to arms 509 are links 788 which are raised and lowered at each operation by means not shown herein to rock the bar 449 out of and then into engagement with the teeth 507 of the rack 508 in order to aline and lock the carriage in its moved position.

*Printing mechanism.*—The printing mechanism is located in front of the machine proper. The framework for this mechanism includes a front frame 321, an intermediate frame 322, and a rear frame 323 (Figs. 28 and 29) all of which are mounted upon the base of the machine.

The entire printing mechanism is driven by the operation of the cash register. The shaft 112 (Fig. 15), has secured to it near the left hand end thereof a spiral gear 324 meshing with a spiral pinion 325 fast on a sleeve 326 loose on a shaft 327. The front end of shaft 327 is supported by the frame 321 and the rear end by a bracket 328 secured to the base of the machine. Fast on sleeve 326 is a disk 329 upon which is pivotally mounted a driving pawl 330 (Fig. 16) and a retaining pawl 331 held in their normal positions by a spring 332. Secured to shaft 327 is a disk 333 provided with a boss 334 normally engaged by the driving pawl 330. The retaining pawl 331 normally rests against the true periphery of the disk 333 in such a position that there is a slight clearance between said pawl and the boss 334.

From the above description it can be seen that with the parts in the positions shown in Figs. 15 and 16 a clockwise rotation of the shaft 112 rotates the disk 329 counter-clockwise and through the engagement of the pawl 330 with the boss 334 fast on shaft 327 rotates said shaft counter-clockwise. The pawl 331 serves to prevent any excessive overthrow movement of shaft 327.

*Racks.*—It will be remembered that appropriate to each differential unit of the machine is a spiral segment 284 (Figs. 3 and 5) loose on a shaft 287 which is moved differentially by the link 279 for each unit. These spiral segments each mesh with spiral gears 335 whose hubs are pinned on the inner ends of shafts 336 supported in the transverse printer frame 323 and a bracket 320. Each shaft 336 carries a gear segment 337 (Fig. 25), fast thereon, meshing with one of a plurality of racks 338 slidably mounted on rods 339 supported by frame 323, said racks being adapted to receive differential movement transversely of the machine through the mechanism above described.

*Rack aliners.*—Means are provided for alining the racks 338 after they have been set by the differential mechanism. The racks 338 have alining notches 340 (Fig. 25) and cooperating with these notches is an aliner 341 slidably supported at one end by a boss 342 on the frame 322 and at its other end by a boss 343 on frame 323. Adjacent the bosses 342 and 343 is an arm 344 fast on a shaft 345 mounted in the frames 322 and 323. The arm 344 engages a slot (not shown) in the aliner 341 and is adapted to be rocked first clockwise and then counter-clockwise to perform its function by an arm 346 (Fig. 26), also secured to the shaft 345. Pivoted to arm 346 is a link 347 pivoted at its opposite end to a member 348 pivotally mounted on a stud 349 in frame 323, and having two rollers each cooperating with one of two cams 350 and 351 fast on the printer drive shaft 327. This shaft is rotated in a counter-clockwise direction (Fig. 27) and through the above described connections rocks the aliner 341 into the notches 340 to aline the racks.

*Tube lines.*—Associated with the racks 338 are two tube lines which are for the purpose of setting the amount, department, transaction, and clerks' type wheels, to be hereinafter described. These tube lines comprise nested tubes 355 supported by shafts 356 and 357 (Fig. 29).

The tubes 355 have secured at their left hand ends (Figs. 28 and 29) gears 358 which mesh with teeth 359 (Fig. 25) on the upper edge of the racks 338. Secured to the right ends of tubes 355 are gears 360 meshing with two sets of type wheels 361, one set loose on a long stud 362 and the other set loose on a long stud 363 both mounted in the frame 322. At their outer ends these studs support a plate 364. These type wheels are for printing the amount, department, transaction, and clerks' initials in a manner to be hereinafter described.

From the above description it can be seen that the differential movement of the racks 338 under the control of the levers 130, 131, 132 and 134 is imparted to the type wheels 361 through the medium of the gears 358, tubes 355 and gears 360, thereby differentially setting said type wheels.

*Type wheel aliners.*—An alining device is provided for the type wheels which cooperates with the gears 360 (Figs. 26 and 28), that mesh direct with both upper and lower sets of type wheels 361.

Loose on the stud 362 are parallel arms 365 and 366, connected by an alining bar 367 adapted to cooperate with the gears 360 on the right hand tubes 355. Loose on stud 363 are parallel arms 368 (only one of which is shown in Fig. 26) connected by an alining bar 369, adapted to cooperate with gears 360 on the left hand tubes 355 (Fig. 26). The arm 365 has a stud which projects into a slot 370 in an aliner operating slide 371 which has two slots 372 and 373 surrounding the rods 362 and 363, permitting a short vertical movement of the slide. The arm 368 also has a pin projecting through a slot 374 in the slide 371. Pivoted on rod 363 is a two-armed lever 375, one of the arms being bifurcated and embracing said pin projecting from arm 368 and the other arm being also bifurcated and engaging a pin carried by an arm 376 secured to a shaft having bearings in frames 322 and 323. Another arm 379 pinned to said shaft has a pin projecting into a slot 377 in link 347. A spring 378 connects this pin with a stud on the link 347, and normally maintains the stud of the arm 379 against the right-hand wall of a slot in the link 347. It will be remembered that this link 347 is moved towards the right (Fig. 26) and such movement through spring 378 will rock lever 376 counter-clockwise and arm 375 clockwise. This moves the alining bar 369 up into engagement with the gears 360 and through slide 371 rocks the alining bar 367 down into engagement with the other set of gears 360 and thereby alines and holds the type wheels in their proper positions.

*Date type wheels.*—There are four type wheels 380 (Figs. 28 and 29) for printing the date. They are adapted to be set manually by means of knurled knobs 381 which are fast on the right hand ends of tubes 382 which on their opposite ends carry gears 383 which engage the type wheels, and transmit the movement of the knobs to said wheels.

To insure that the date wheels are in proper alinement for printing, there are four gears 384 rotatably mounted on a hub 385 surrounding the shaft 356. These gears are in mesh with the date type wheels 380 and are engaged by spring-pressed pawls 386 mounted on a stud in block 387. When the date knobs are manipulated these pawls bring the date type wheels into absolute alinement.

*Consecutive number type wheels.*—Loose on each of the studs 362 and 363 are six consecutive number type wheels 390 (Figs. 28 and 29) which are for the purpose of printing the consecutive number on the detail strip and slip or check. Meshing with both sets of type wheels are gears 391. Secured to the side of each gear 391 is a ratchet 392. Cooperating with ratchets 392 are differentially tined pawls 393 which are adapted to be given a clockwise movement (Fig. 21) at each operation by mechanism not shown herein. This movement will rotate the units consecutive number wheel one step at each operation of the machine. The means for operating this mechanism is fully described and shown in the above mentioned Shipley Patent No. 1,619,796. A key 394 (Fig. 28) is provided which when it is rotated turns the consecutive number wheels to zero by means of a groove in the hub and pawls on the wheels, as is well known in the art.

*Zero elimination mechanism.*—After the racks have been positioned by the actuation of the differential actuators, and before an impression is taken from the type wheels associated with these racks, a mechanism is operated which is for the purpose of preventing the printing of ciphers to the left of the highest denomination represented by a digit other than a cipher in any printed number and for permitting the printing of ciphers to the right. This mechanism which is known in the art as a "zero elimination" mechanism, will not be specifically described herein. In general terms this mechanism comprises hooked levers 400 (Fig. 25) which normally engage shoulders 401 in racks 338 and hold them in the eliminated position. At the beginning of an operation the hooked levers are first rocked away from the shoulders 401 by means of a cam 402 fast on shaft 327 rocking a bell crank 403, which movement through a link 404 rocks a bell crank 405 counter-clockwise (Fig. 25), and as this bell crank carries a pin on which the hooked levers 400 are mounted, it is clear that they will be rocked away from the racks. This movement is required in order to permit any desired rack to be set by the differential mechanism. When the hooked levers are rocked as described, springs are put under tension and through the engagement of levers 407, to which they are attached, with projections 408 on the racks, move the racks to the position in which their zeros are on the printing line. This movement is limited by the engagement of tails 409 on the levers 407 with a pin 410 projecting from frame 323.

Before an impression is taken the cam 402 rocks the bell crank 403, and therefore bell crank 405, to normal position. When this occurs the hooked levers 400 pick up all racks to the left of those differentially set and move them to the "eliminated" position in the well known manner.

*Printer—detail strip.*—The present machine is adapted to print on a detail strip. The detail strip, together with its supply, receiving and guide rolls, is clearly shown in Figs. 18 and 21. As it is substantially a duplicate of that shown and described in the before mentioned Patent No. 1,619,796, issued to B. M. Shipley, it will not be described herein except in a very general way, as reference may be had to said patent for any desired details.

The strip 416 is fed from a supply roll 417 around a roller 418 carried by a lever 419 pivoted on a stud (not shown) in the printer frame. From the roller 418 the strip is passed to the right over a rod 420 carried by parallel arms 421 made integral by a yoke 422 loose on a stud 423 mounted in the frame 322. From the rod 420 the strip is fed toward the right under a platen 424 carried by a U-bar 425 mounted in a block 426 integral with the arms 421, up and over the top of said block and to the left over a roller 427 on a stud 428 carried by a lever 429, to a receiving roll 430, loose on a stud 431 mounted on the frame 322.

The means for feeding the detail strip is neither shown nor described herein. Such means is provided and is identical with that described in the aforesaid Shipley patent.

A lever 432 is provided for causing the detail strip to be fed a greater distance than it would be ordinarily, to prevent a succeeding impression from conflicting with any notations written thereon.

The glass through which the strip is visible is cut away to form an opening 433 (Fig. 1), through which said notations can be made on said strip. An extension 434 is also provided to form a rest for the hand while writing on the strip.

The means for taking an impression from the upper set of type wheels on the detail strip will now be described. Loose on the stud 423 and fast on the arm 421 is an arm 435 (Figs. 18 and 21) which is pivoted to a link 436. This link at its opposite end is pivoted to a lever 437 (Fig. 19) loose on a rod 438. This lever carries two anti-friction rollers 439 and 440 cooperating with cams 441 and 442 respectively, fast on a shaft 443. Also fast on the shaft 443 is a Geneva wheel 444 adapted to cooperate with a pin 445 on a disk 446 fast on shaft 327. It can be seen from the above that as the shaft 327 is given one counter-clockwise rotation at each operation, the Geneva plate will be rocked clockwise by the pin 445 until the pin passes out of engagement with the one of the slots in said plate which it had engaged. This movement of the Geneva plate will rotate the cams 441 and 442 and thereby rock the lever 437 clockwise and through link 436 and arm 435 move the platen down far enough to take an impression from said type carriers on said strip.

The detail strip is made narrower than the type line so that the date type wheels will not print thereon. The upper platen is divided, the portion which is above the date type wheels being separate from the rest of the platen. Means are provided for preventing the descent of this portion over the date wheels when an impression is to be taken on the detail strip and for permitting this portion to operate when a check (to be described later) is issued. No description of this mechanism will be given herein, as reference may be had to the Shipley patent before mentioned for such description.

*Printer—check mechanism.*—The paper from which the checks are printed, cut and ejected from the machine, is in a supply roll 450 (Figs. 1, 2, 18 and 21) loose on a stud 451 mounted in a bracket 452 secured to the frame 322. The paper is fed from the bottom of the roll through a chute 453 supported on studs 454 and 455 in the frame 322, between an electro roll 456 and an impression roll 457, between another electro roll 458 and an impression roll 459. From the rolls 458 and 459 the paper is fed through a guide 460 mounted on a knife block 461 secured to end plates 462 and 463 (Figs. 18 and 21). The block and plates form a rigid unit. The plate 463 is mounted on a stud 464 on frame 322 and the plate 462 is mounted near the end of the stud 423 and the stud 464. Screws 465 hold the knife block in position. From the guide 460 the paper is passed between the block 461 and a guide strip 466 and from there through a guide 467 and is passed under the detail strip 416 between the platen and the upper set of type carriers.

*Impression and ink roll carriage.*—A frame 468 and a frame 469, best shown in Figs. 22, 23, and 24, are secured together by rods 470 and 471. These plates are supported by long studs 472 and 473 mounted in the frame 322 and projecting into tubes 474 and 475 which carry the impression rolls 459 and 457 respectively. Loose on each rod 470 and 471 is a pair of arms 476 and 477 which are made integral by a yoke 478. Rotatably mounted on rods 494 and 495 supported in the arms 476 and 477 are ink rollers 479 and 480 adapted to ink the electro rollers 456 and 458 which are carried by long studs 481 and 482 projecting from frame 322. The ink rolls are maintained in contact with the electro rolls by means of coil springs 590 surrounding the rods 470 and 471. These studs 481 and 482 have grooves cut near their ends and project through holes 483 and 484 respectively in the frame 468 and are adapted to be engaged by semi-circular recesses 485 of a lever 486 pivoted at 487 to the frame 468, thereby locking said impression roll carriage in its position on the machine, as shown in Fig. 18. The carriage is adapted to be removed from the machine for the purpose of cleaning and inking the ink rolls 479 and 480. It is shown detached from the machine in Figs. 22, 23 and 24.

When it is desired to remove the carriage it is necessary to rock the lever 486 clockwise (Fig. 18) by means of a pinch lever comprising an ear 488 formed on the lever 486 and a pivoted arm 489 carried by lever 486 and having a hook 490 adapted to latch over a pin 491 carried by frame 468 and hold the lever 486 in its "On" position. The hook 490 is held in engagement with the pin 491 by a spring 492 compressed between the ear 488 and arm 489. A pin 493 in the arm 489 engages the periphery of lever 486 and limits the clockwise movement (Fig. 24) of arm 489.

It can be seen from Fig. 21 that each electro roll 456 and 458 normally has in contact therewith its inking and impression rolls. Before the carriage carrying these rolls can be removed it is necessary to move the inking and impression rolls away from their electro rolls. In order to move the ink rolls the lever 486 has two cam surfaces 1492 and 1493 cooperating with the ends of the ink roll supporting rods 494 and 495 which project through slots 496 and 497 cut in the frame 468. It can be seen therefore that when the lever 486 is moved from its "On" to its "Off" position the cam surfaces 1492 and 1493 move the ink rolls 479 and 480 respectively away from their corresponding electro rolls, against the tension of springs 590. Each of the impression rolls 457 and 459 is rotatably mounted on enlarged bearings 1494 (Fig. 23) provided at each end of the tubes 474 and 475. These members are hollowed out between the bearings (Figs. 21 and 23) in order to permit the long studs 472 and 473 which support the carriage to pass through them. At its left hand end each rod carries a hollow stud 651 set eccentrically which is supported in the frame 469. At its right hand end each rod has a hole drilled eccentrically therein into which projects a stud 652 carried by a disk 498 rotatably mounted in the frame 468. The disk 498 also has a stud 499 on which is mounted a partial gear 500 the teeth of which engage teeth 501 formed in the lever 486. The partial gears 500 are secured to the tubes 474 and 475 by set screws 502 which pass through radial slots 503 in the partial gears. It is clear that by loosening the set screws 502 the impression rolls can be adjusted eccentrically. When the lever 486 is moved from its "On" position (Fig. 18) to its "Off" position (Fig. 22) the teeth 501 on said lever will rotate the partial gears 500 counter-clockwise and, therefore, due to the eccentric mounting of the impression rolls, move said rolls away from their corresponding electro rolls far enough to permit the easy removal of said carriage.

When it is desired to feed the check strip through the printer all that is necessary is rock the lever 486 from its "On" to its "Off" position. This movement simultaneously moves the impression rolls away from the electro rolls, leaving sufficient space for the paper to easily pass between. When the lever 486 is again moved to its normal position the paper is gripped between the electro rolls and the impression rolls in position to be fed.

*Check feeding.*—It will be remembered that the electro rolls are loose on studs 481 and 482. The rolls are connected to gears 505 and 506 by mortise and tenon (not shown). These gears are loose on the studs 481 and 482. The gear 505 is driven by a train of gears, not shown herein, which is actuated by the engagement of a pin on a disk fast on shaft 327 with a Geneva plate. On the rotation of shaft 327 the Geneva plate is given a partial clockwise movement due to the engagement of the said pin with one of its notches and, through the beforementioned train of gears, rotates gear 505 counter-clockwise and gear 506, which meshes with gear 505, clockwise far enough to feed the check paper through the machine.

During the feeding of the check paper the electro rolls 456 and 458 print the advertising matter on the checks, as illustrated in Figs. 30, 31 and 33.

*Check impression.*—The present machine is adapted to print either a plain check (Fig. 30) or a stub check (Fig. 31). The mechanism as shown herein in Fig. 19 is set to issue a stub check. The only difference between a single check and a stub check is that a stub check receives two impressions from the upper set of type wheels while the single check receives only one impression from these type wheels. The stub check is perforated between the impressions so that the stub may be easily separated from the check.

As previously described, the Geneva wheel 444 (Fig. 19) is rotated clockwise by the pin 445 to bring the platen 424 into contact with the type wheels to print on the detail strip. Secured to the disk is a pin 511. The disk 446 has an opening 512 so that an arm 513 may lie in the same plane with said disk. This arm is secured to a hub made to rotate with the shaft 327 by means of a key 514 and carries a pin 515 similar to pin 511. During the rotation of the disk the pins 511 and 515 engage the Geneva wheel and give it two more partial rotations, each one of which causes the platen to contact the type wheels to make impressions on the check (Fig. 31).

*Check perforator and knife.*—The frames 462 and 463 support a shaft 518 which carries two arms 519, the right hand ends of which (Fig. 21) carry the knife 520 and the left hand ends of which carry a bar 521 to which is fastened the perforator 522. Both the knife and the perforator bar are slidably mounted in grooves in the frames 462 and 463. Fast on shaft 518 is an arm (not shown) to which is pivoted a link, which at its other end is pivoted to an arm 523 (Fig. 20), fast on a shaft 524. Also fast on shaft 524 is a two-armed lever 525 one arm of which carries a roller 526 and the other arm a roller 527. When a single check is to be issued the roller 527 encounters a projection 528 on a cam 529 keyed to shaft 327, and rocks the shaft 524 and arm 523 clockwise (Fig. 20). This movement through the link and arm before mentioned rocks shaft 518 and therefore arms 519 clockwise (Fig. 21). The knife 520 is thereby lowered and severs the single check.

When, however, a stub check is to be issued, a disk 530 (Fig. 20), slidably mounted on shaft 327 and keyed thereto, is slid toward the left (Fig. 2) by the turning of a knurled knob 531, which is mounted on the end of a shaft 532. The turning of this shaft slides a sleeve 533 to the left by means of a curved slot in said sleeve cooperating with a pin on said shaft, as is well known in the art. This sleeve 533 carries a bifurcated arm 534 (Fig. 20), which engages a channeled member (not shown) and which in turn moves the disk 530 as described. This disk carries a lobe 535 which, when the disk is moved, comes into the plane of the roller 526 carried by two-armed lever 525. Then when the shaft 327 is rotated the node 535 contacts the roller 526 and rocks the lever 525 counter-clockwise (Fig. 20) and through the above described connections rocks the shaft 518 counter-clockwise and thereby moves the perforator 522 down to perform its function. Near the end of the rotation of the shaft 327 the lever 525 is rocked clockwise, as before described, to lower the knife and sever the check.

*Check ejection.*—The check is ejected from the machine at the end of an operation by means of knurled rollers 536 and other rollers (not shown) which cooperate with them. These rollers are given a very rapid rotation by means not shown herein and they forcibly eject the check. A full description of this mechanism can be found in the before-mentioned patent to B. M. Shipley.

*Manual check control.*—Means are provided herein for manually setting the printing mechanism so that a check, whether it be a single check or a stub, will be issued by the printing mechanism. The manual means can also be set so that no check at all will be issued. This means is controlled by knurled knobs 531 and 537 (Fig. 18) carried by a sleeve 538 and shaft 532. This mechanism is not shown or described herein as it forms no part of the present invention.

*Slip feeding mechanism.*—The machine is designed for printing upon an inserted slip such as illustrated in Fig. 32. The slip is placed on a table 540 (Figs. 1, 18 and 21). An arrow on the cabinet (Fig. 1) is the guide for placing the slip in the machine so that the first impression will be made on the top sheet (Fig. 32). The impressions are made from the lower set of type wheels.

Loose on a shaft 438 is a pair of arms 541 made integral by a yoke which carries a U-bar 542 which in turn supports a rubber platen or hammer 543. Formed on one of the arms 541 is a hump 544 from which projects a stud 545 which is held in contact with a flat surface 546 of an arm 547 whose hub is fast on shaft 438, by a spring 548 extending between the stud 545 and a stud 549 on a downwardly extending portion of arm 547. Also fast on the same hub with arm 547 is an arm 550 which normally abuts against a stop 551 integral with the machine frame. Fast on shaft 438 is an arm 586 which carries a roller cooperating with a cam (not shown) secured to the side of a gear 552 loose on shaft 524, said cam having two lobes. Gear 552 meshes with a gear 553 fast on a gear 554 loose on shaft 443, which in turn meshes with a gear (not shown) on shaft 327. Through these gear connections said impression cam is rotated counter-clockwise and thereby rocks arm 586, shaft 438 and arm 550 clockwise (Fig. 21). Through its hub, arm 547 is also rocked clockwise thereby permitting the platen carrying arms 541 to descend by gravity assisted by spring 548. Then when the roller on arm 586 passes a lobe on the impression cam the shaft 438 is given a very rapid counter-clockwise rotation by means of a powerful coil spring 510 extending between the arm 550 and a stud on the machine frame. As the arm 547 is fast on said shaft it is also rotated rapidly counter-clockwise, and thereby moves the platen carrying arms likewise in order to bring the platen against the slip. For the purpose of getting a clear impression the arm 550 comes in contact with the stop 551 just before the platen strikes the slip. As there are two lobes on the impression cam, two impressions will be made on the slip.

*Slip tensioning and feeding means.*—The means for holding the inserted slip while it is being printed upon consists of two knurled rollers 555 fast on a sleeve (not shown) carried by a stud 556 supported by an arm 557 loose on a shaft 558. Integral with the arm 557 is a downwardly extending arm 559 to which is pivoted a link 560. This link, by means of a cam and various connections, not shown or described herein, is moved toward the left (Fig. 21), which movement rocks the arm 557 clockwise and brings the rollers 555 up against the slip. These rollers cooperate with a roller 561 mounted on a stud projecting from frame 322. The slip is gripped between the rollers 555 and roller 561 and is held during the time necessary to take two impressions from the type carriers after which it is released.

The slip is fed between impressions by the rotation of the knurled rollers 555 and roller 561. The stud 556 has loosely mounted thereon an arm 562 to which is pivoted a link 563, pivoted at its opposite end to an arm 564 loose on shaft 558. Also pivoted to arm 564 is a link 565, pivoted at its opposite end on a stud 569 carried by a short link 566. This link 566 is pivoted to an arm 567 fast on a sleeve 572 surrounding shaft 524. Also loose on shaft 524 is a slotted arm 568 embracing the stud 569. Also pivoted to slotted arm 568 is a pitman 570 cooperating with a cam (not shown) on shaft 327. When this shaft is rotated counter-clockwise (Fig. 21) the pitman 570 is moved first toward the right and then returned to normal position. This movement, through slotted arm 568, link 565 and link 563, moves arm 562 first counter-clockwise and then clockwise. This arm carries a roller 571 which operates in a recess in said arm. When the arm 562 is rocked counter-clockwise (Fig. 21) the roller 555 will not be moved, but when arm 562 returns to normal position the roller 571 will wedge between one wall of the recess of the arm and the inner periphery of the roller 555 and cause said roller to be rotated in a clockwise direction to feed the slip. A roller 1571 is mounted in a recess of arm 557 and cooperates with the roller 555 to allow the the roller to move in a clockwise direction and prevent it from moving in a counter-clockwise direction.

Should it be desired to change the distance between the impressions on the slip in case a different style slip is used, there are means provided for adjusting the mechanism just described so that the rollers 555 and 561 can be rotated a greater distance than as just described.

Secured to the sleeve 572 is an adjusting disk 573 (Fig. 18) having a slot 574. The disk is held in position by a screw 575 projecting through the slot. By loosening the screw 575 and moving said adjusting disk clockwise (Fig. 18) the arm 567 is moved clockwise (Fig. 21) and moves the stud 569 downwardly in the slot in the arm 568 thereby moving said stud farther away from the center of shaft 524. As the link 565 is moved back and forth through the medium of the slot in arm 568 and stud 569 it is clear that, owing to the form of said slot, the farther away from the center of shaft 524 the stud is positioned the greater will be the movement of the link 565. By this means the slip feeding mechanism may be advanced varying distances to accommodate various slips.

When there is no slip in the machine the platen 543 is prevented from contacting with the type wheels. Pivoted on a stud 576 (Fig. 18) is a slip feeler 577 having an upwardly extending finger 583 and a downwardly extending hump which is bifurcated to embrace a stud 578 on a pitman 579 having a roller cooperating with a cam 580 fast on shaft 327. The roller is held in contact with the cam by a spring 581 stretched between a pin on the pitman and a stud on the frame. The pitman 579 is pivoted to an arm 582 loose on a stud (not shown) mounted in the frame 321. The arm 582 has a vertical extension normally in the position shown in Fig. 18. Upon counter-clockwise rotation of the cam 580 (Fig. 18) the pitman 579 is moved to the right by the spring 581. If there is no slip in the machine the finger 583 of the slip feeler 577 passes through an opening (not shown) in the table 540 and the pitman 579 rocks the arm 582 counter-clockwise until the extension 584 thereof lies beneath a foot 585 integral with the U-bar 542. With the parts in the position just described the clockwise movement of the arm 550 (Fig. 21) stretches the springs 548 and 510, but due to the extension 584 being beneath the foot 585 the spring 548 cannot pull the platen downward. Therefore when the arm 586 drops off the lobes of the impression cam the spring 510 rocks the arm 550 and arm 547 until said arm 550 contacts with the stop on the base, but as the arms 541 were not rocked clockwise, the platen 543 is not moved against the type wheels. As the cam 580 nears the completion of its rotation the lobe thereon engages the roller carried by pitman 579 and moves said pitman to the left to normal position thereby rocking the arm 582 clockwise out of the path of the foot 585.

When there is a slip in the machine the finger 583 of the slip feeler 577 contacts the under side of the slip and as a consequence said feeler is rocked only slightly in a counter-clockwise direction. When the lobe of the cam 580 leaves the roller on pitman 579, the spring 581 not being strong enough to cause the finger 583 of the feeler 577 to tear the slip, the extension 584 will not be moved under the foot 585, and the platen may be lowered to its full extent, as above described.

An arm 1700 (Fig. 18), fast on a shaft 1701, mounted in the printer frames 321 and 322, carries a flexible pawl 1702. This pawl co-operates with a pin 1703 carried by a slide 1704 mounted on pins projecting from arm 582. When a slip is in the machine the arm 582 is moved counter-clockwise a short distance until finger 583 comes in contact with the slip. Then near the end of the operation the arm 1700 is given a counter-clockwise movement, which brings the pawl 1702 into contact with pin 1703, rotates arm 582 to its normal position and holds it there until cam 580 returns to zero. The arm 1700 is then returned to its normal position.

When no slip is in the machine the arm 582 is rocked farther counter-clockwise so that when arm 1700 is rocked as above described the pawl 1702 will not strike pin 1703. Then near the end of the operation when both arm 582 and arm 1700 are returned to normal position the pin 1703 strikes the upper side of pawl 1702 but as the pawl is flexible the pin simply rocks the pawl far enough to permit it to pass by.

*Ribbon mechanism.*—The means for inking the upper and lower sets of type wheels is an ink ribbon 586 (Fig. 21) supported by seven sleeves 587 secured to plate 588 (Fig. 18) and an ink roller 589 loose on a sleeve 590 carried by the plate 588. The roller 589 is made of felt or other suitable ink receiving material. The sleeves 587 are supported by studs 591 on the frame 322. This manner of mounting is convenient in that by removing the plate 588 the entire ribbon and inking roller may be removed from the machine as a unit. The plate 588 has openings for the date knobs and for the insertion of key 394 to reset the consecutive number wheels.

Tension on the ribbon 586 is maintained by a roller 592 (Fig. 21) carried by parallel arms 593 loose on a rod 594 supported by the frame 322. The roller is held against the ribbon by gravity. The ribbon is fed at every operation of the machine in order to bring a freshly inked surface into printing position. This is accomplished by means of a ratchet fast on the end of the inking roller which is driven by a pawl (not shown) carried by a link 595 which is operated by the same means that operates the consecutive number feed. This mechanism is not shown herein as it forms no part of the present improvements. Reference however is made to the patent to Bernis M. Shipley, No. 1,619,796, in which this mechanism is shown and described in detail.

*Total and subtotal mechanism.*—In order to allow sufficient time for the return of the tripped transfer devices to untripped position and for the selection of a totalizer and the engagement of said totalizer with the actuating segments 227 when a total or sub-total is to be printed, the main drive shaft 112 is given two continuous rotations on such operations instead of one, as in adding operations. During the first rotation of the shaft 112 the tripped transfer devices are restored to untripped position, and one of the totalizers is moved into engagement with its segments 227. During the second rotation of the shaft the engaged totalizer pinions 231 control the extent of movement of the differentially movable members and hence the setting of the type wheels to print a total or sub-total on the record strip.

To permit two rotations of the shaft 112 in total and sub-total operations, the lever 137 controls mechanism shown in Figs. 10 and 17 to prevent the restoring of the motor locking lever 82 (Fig. 2) to normal locking position until near the end of the second rotation.

Slidably mounted on the stud 124 (Figs. 10 and 11) is a link 620 one end of which is pivoted to a lever 621 loose on the stud 117. Pivoted to the link 621 is a lever 623 also pivoted to an arm 624 fast on a shaft 625. The link 620 has a stud 626 projecting into a slot 627 in the link 177. The link 620 has two pins 628 one on each side of a coupling plate 629 slidably mounted in a groove 630 in a disk 631. The link 620 also has an anti-friction roller 632 normally projecting into a notch 633 in the disk 631, mounted on the stud 124. The gear 123 has a circular recess in which the disk 631 lies.

Fast on the shaft 625 (Fig. 17) is an arm 634 carrying a pin 635 projecting into a slot 636 in a lever 637 loosely mounted on a stud 638 in the machine frame. Also loose on the stud 638 is a lever 639 having an arm 640 carrying a roller 641 cooperating with a slot 642 in a disk 643 which is integral with the total lever 137.

The movement of the total lever 137 either up or down rocks the lever 639 counter-clockwise through the engagement of its pin 641 with slot 642. This movement is transmitted to lever 637 through a coil spring 647 supported by projections 644 on the levers 637 and 639, and moves said lever 637 counter-clockwise. This movement through pin 635 rocks arm 634 and shaft 625 clockwise (Fig. 17). Clockwise movement of this shaft 625 rocks the arm 624 clockwise (Fig. 10) whereby through the link 623 the lever 621 is rocked clockwise and moves the link 620 to the left. This movement of the link 620 through the engagement of pins 628 with the coupling plate 629 moves said coupling plate to the left into engagement with a notch 645 in the gear 123 thus connecting said gear and the disk 631. At the same time the roller 632 is moved into a cam slot 646 in the disk 631. The movement of the link 620 also rocks the link 177 clockwise about the stud 161. As the disk 631 is connected to the gear 123 the counter clockwise movement of said gear and disk through the cam roll 632 moves the link 620 still farther to the left and rocks the link 177 still farther. When the lever 118 is lowered near the end of the first half rotation of the gear 123 by the cam portion 224 as described in adding operations, the stud 209 moves idly in the elongated portion of the opening 221 thus preventing the link 177 from rocking the shaft 88 to return the motor locking lever to normal position. As lever 87 is not rocked to normal position, the lever 82 is not locked near the end of the first rotation of shaft 112, when the pin 115 raises the link 113 to rock the lever 82 to normal, and therefore the spring 95 immediately rocks the lever 82 to allow the motor clutch to drive the gears and shaft 112 a second rotation.

Near the end of the complete rotation of the gear 123 the link 620 is moved to the position in which it was adjusted by the total lever 137, so that when the lever 118 is rocked clockwise the second time by the second cam portion 224, the stud 209 engages a shoulder 650 in the opening 221 to lower the link 177 to rock the lever 160 and shaft 88 counter clockwise (Fig. 10) slightly past normal position, but not as far past normal position as in adding operations. Just before this movement of the lever 87 the pin 115 (Fig. 2) rocks the lever 82 to normal and the lever 87 when moved past normal, engages the pin 85 and locks the lever 82 to stop the motor as in adding operations. The shaft 88 is rocked slightly past normal so that the stud 198 (Fig. 14) is carried to the rear of the lever 206 and said lever is rocked clockwise by the spring 208 to prevent an immediate second operation of the machine when the total lever is out of its adding position. With the lever 206 in front of the stud 198 when the total lever is out of adding position, the arm 197 is rocked clockwise to normal position which moves the lever 206 out from in front of the stud 198 and the spring 163 rocks the shaft 88 and arm 199 to normal position.

In totalizing operations a selected totalizer is moved into engagement with the segment 227 before said segment is moved by the segment 226 and latch 232, whereby the differential movement of the segment 227 is controlled by the totalizer pinions 231. After the actuators have been moved differentially under the control of said totalizer pinions, the totalizer is disengaged from the actuator thereby leaving the totalizer at zero.

In sub-totalizing operations the totalizer is engaged with the actuator before the actuator is moved differentially and held in engagement with said actuator to control the differential movement thereof to print a sub-total. The totalizer is also held in engagement with the actuator while said actuators are being returned to normal thereby restoring to the totalizer the amount which was taken therefrom.

The mechanism whereby the said totalizer controls the differential movement of the actuators during total and sub-total operations will now be described.

Fast on three shafts 190 (Figs. 5, 9 and 17) are partial gears 656 whose teeth mesh with segments 657 pivoted on studs 658 in plates 211. Each of the segments 657 has an extension 659 having a slot 660 surrounding a stud 661 in a link 662 pivoted at its opposite end to an arm 663 fast on a sleeve surrounding stud 658. Also pivoted on stud 661 is a link 664 pivoted to a lever 665 pivotally mounted on a stud 666 in hanger 211. This lever 665 carries a half round stud 667 which is adapted to cooperate with teeth 668 on the inner periphery of the before mentioned reset spider 246.

The shafts 190 are adapted to be rotated slightly in a counter-clockwise direction (Fig. 5) whenever the total lever 137 is moved out of its adding position. This movement of shaft 190 through gear 656 and segment 657 will straighten the toggle formed by links 662 and 664.

Fast on the sleeve which supports the arm 663 is an arm 669. When the total lever is moved and thereby rocks shaft 190 and gear 656 as previously described, the arm 669 is rocked clockwise, upon the straightening of the toggle formed by links 662 and 664 by the segment 657, into the path of the long tooth 670 of each totalizer wheel. When, therefore, the selected totalizer wheels 231 are rocked into engagement with the actuators 227 and rotated to their zero positions the long teeth 670 will strike the arms 669 and through arms 663 and links 662 and 664 rock the lever 665 clockwise (Fig. 5) and cause the half round stud 667 to engage one of the teeth 668 on reset spider 246. It will be remembered that this reset spider 246 surrounds a stud 248 carried by the latch 241 and therefore when the movement of the reset spider 246 is arrested as above described the latch 241 will be disconnected. On total taking operations the totalizer wheels are then disengaged from the actuators as they are at zero, but on sub-total operations the totalizer wheels remain in mesh with the actuators thus allowing the amounts taken off of them to be replaced.

After the beam 275 has been set the totalizer is disengaged from the segment 227 thereby leaving the totalizer in its zero position. When the totalizer is disengaged the spring 671 (Figs. 5 and 9) rocks the lever 665 counter-clockwise to normal position thereby disengaging the stud 667 from the reset spider 246.

The disk 643 is then manually rocked to its normal or add position whereby the shaft 190 and partial gear 656 are rocked clockwise and rock the segment 657 counter clockwise to normal, thereby lowering the link 662 and rocking arm 663 and arms 669 counter-clockwise to normal position. This movement of the segment also rocks link 664 clockwise to normal position.

To prevent the segment 657 from getting out of mesh with the gear 656 and also to prevent the arms 669 from getting out of the plane of the pinion 231, a plate 675 is secured to the plate 211 and a collar 676 is pinned to shaft 190 adjacent said plate.

Should the totalizer be in the zero position when it is rocked into engagement with the segments 227, the long teeth of the totalizer pinions will immediately strike the arms 669. When this occurs the clockwise movement of the segments 657 through the engagement of their arms with the studs 661, straightens out the links 662 and 664 and immediately rocks the lever 665 clockwise whereby the stud 667 engages the notch 668 in the zero position. Consequently the latch is disengaged at zero and the segment 227 is not moved beyond the zero position.

*Total and sub-total mechanism—interlock.*—As it is not necessary to move any of the amount levers during a total or sub-total operation, means are provided for preventing their adjustment when the total lever is out of adding position. As no amount levers are moved it is also necessary to render the zero stop pawls ineffective in order that the differential mechanism may be controlled by the long teeth 670 of the totalizer pinions 231 as above described.

As above stated, when the total lever is moved either above or below its adding position, the shaft 625 is rocked clockwise (Fig. 5) or counter clockwise (Fig. 3). This shaft has secured thereto a pair of arms 677 carrying a universal rod 678. Counter clockwise movement (Fig. 3) of shaft 625 and arms 677 moves the rod 678 downward in front of a foot 679 integral with the arm 270 which it will be remembered is moved counter-clockwise (Fig. 3) by the movement of its appropriate amount lever 130. With the rod 678 in front of the foot of arm 270 it is clear that said arm cannot be rocked and therefore the corresponding lever cannot be moved.

As previously described, the shaft 625 is rocked further counter-clockwise by the mechanism shown in Fig. 10 whereupon the rod 678 engages the lower end 780 of the zero stop pawls associated with each of the amount levers and rocks said pawls counter-clockwise (Fig. 5) so that their upper ends cannot disconnect the latch at zero.

Pivoted to the total lever disk 643 is a link 680 connected to an arm 681 loose on shaft 287. Rigid with the arm 681 is a spiral segment 682 meshing with a spiral pinion 683 fast on a shaft 684 mounted in the frame 322 and bracket 320. Also fast on the shaft 684 is a segment 685 (Figs. 17 and 25) meshing with a rack 686 slidably mounted on the shafts 339. The rack has teeth on its upper edge which mesh with a segment 688 loose on the stud 689. Integral with segment 688 is a segment 690 meshing with a plate 691 slidably mounted on studs 692 on the frame 323. The upper edge of the plate has notches 693 cooperating with the lower ends 694 (Fig. 6) of the arms 270 associated with the transaction, clerks', and departmental levers. The interlocking mechanism between the various levers will not be claimed herein since the same is embraced in a divisional application filed September 28, 1931.

On total printing operations the printer drive shaft is only given one rotation whereas the register proper receives two rotations. This is accomplished by means of a lever 700 fast on shaft 625 which is rocked clockwise whenever the total lever 137 is moved either up or down. This movement through a link 701, rocks a yoke 702 loose on shaft 190. The yoke has a finger 703 cooperating with the pawl 330. Movement of the total lever rocks the finger 703 of the yoke 702 in front of the pawl 330. Upon rotation of disk 329 pawl 330 will be rocked out of engagement with the boss 334 and the printer drive shaft 327 will not be rotated. Near the end of the first rotation the shaft 625 is given an additional movement which rocks finger 703 away from pawl 330 and permits said pawl to return to its normal position and drive the printer during the second rotation of the registering mechanism.

Movement of the total lever 137 (Fig. 17), out of its adding position rotates the spiral segment 682 either clockwise or counter-clockwise as the case may be, and through its engagement with the pinion 683 rotates the shaft 684 and segment 685 to move the rack 686 (Fig. 25) to the right or left. Movement of this rack through segments 688 and 690 moves the rack 691 to the right or left and positions one of the notches 693 directly in front of the foot 694 (Fig. 6) of the arm 270 associated with one of the three control levers depending upon the position of the total lever 137. In front of the arms associated with the other two banks is positioned a solid portion of the rack 691 thereby preventing counter-clockwise movement of these two arms and consequently preventing the movement of the levers in those banks.

In total and sub-total printing operations it is not desirable to have certain features of the machine operate, which operate on adding operations, and mechanism is provided for crippling these various mechanisms on total and sub-total operations. These features are the indicating mechanism, the zero elimination mechanism, the consecutive number printing mechanism, and the automatic check issuing mechanism. The means for accomplishing this crippling will not be described herein as it does not enter into the present invention. If a description of this mechanism is desired, reference may be made to the before mentioned Patent No. 1,619,796, issued to Bernis M. Shipley.

*Operation.*—A very brief description of an adding operation will now be given. Let it be assumed that clerk "N" made a cash sale of $27.50 in Dept. 3X. The operator moves the amount levers 130 to register $27.50, the department lever 131 to 3X, the transaction lever 132 to "Cash" and the clerk's lever 134 to "N". He then depresses the release key 180 which releases the shaft 88 (Fig. 2) whereby the motor locking lever 82 is released to allow the motor to operate and rotate the shaft 112 one counter-clockwise rotation.

The differential mechanism (Fig. 9) is positioned under the control of the amount levers 130 after which all three totalizer lines are rocked into engagement with the differential segments 227 so that when the differential mechanism is restored to normal position the amount thereon is accumulated upon three totalizers.

The type wheels 361 are set under the control of the racks 338 and the zero elimination mechanism is operated to eliminate the four highest amount racks to prevent the printing of zeros to the left of the amount $27.50. The consecutive number, clerk's initial, character of the transaction, number of the department and amount of the transaction are all printed on the strip, as illustrated in the seventh line of printing in Fig. 34, and the check shown in Fig. 31. The date is also printed on the check but not on the detail strip. As the knob 531 is in the "Stub check" position the check will receive a perforation thus making a stub check.

If a slip had been printed upon during this operation it would have received the date, consecutive number, clerk's initial, character of transaction, number of the department, and the amount. An "S" would also have been printed on the detail strip, slip and check.

After the printing has taken place the check ejecting mechanism is operated to eject the severed portion from the machine.

During the last part of the rotation of shaft 112 the totalizers are disengaged from the actuators and all parts of the machine are restored to normal position.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, in combination with a drive member having an invariable path of travel; a variably movable actuator releasably connected with the drive member; and a latch to effect such connection; of a lever normally lying out of the extreme path of the actuator; and a stop carried by the lever adapted to control the length of the variable excursions of the actuator, depending upon the position to which the lever is adjusted out of normal.

2. In a machine of the class described, the combination of a differential mechanism, a lever adjustable to any of a variety of positions corresponding with a series of digits of different values in the same denomination to control the excursions of the differential mechanism, and normally occupying a neutral position above that corresponding to the digit of highest value in its denomination, a zero stop pawl for controlling said differential mechanism when the lever is left in its normal position, and means actuated by the lever when moving out of its normal position to rock the zero stop pawl to its ineffective position.

3. In a machine of the class described, the combination with a totalizer wheel; a drive member having an invariable travel at each operation of the machine; an actuator for the totalizer wheel, the actuator shiftable differentially from its normal home position; and a releasable connection carried by the actuator to connect it with the drive member; of a single differentially adjustable member normally lying beyond the farthest travel of the releasable connection; an abutment on the differentially adjustable member and adjustable thereby into the path of the releasable connection; and means to automatically move the differentially adjustable member out of the path of the releasable connection during each operation of the machine.

4. In a machine of the class described, the combination with a totalizer wheel; a drive member having an invariable travel at each operation of the machine; an actuator for the totalizer wheel, the actuator shiftable differentially from its normal home position, and a releasable connection carried by the actuator to connect it with the drive member; of a single differentially adjustable member normally located in a position beyond the farthest point to which the releasable connection can advance from its normal position; an abutment on the differentially adjustable member adapted to lie in the path of the releasable connection in any of the positions to which the differentially adjustable member can be set out of normal; and means to automatically move the differentially adjustable member out of the path of the releasable connection during each operation of the machine.

5. In a machine of the class described, the combination with a totalizer wheel; a drive member having an invariable travel at each operation of the machine; an actuator for the totalizer wheel, the actuator shiftable differentially from its normal home position; a releasable connection carried by the actuator to connect it with the drive member; and a zero arresting pawl normally lying in the path of the releasable connection upon its advance from its normal position of rest; of a single differentially adjustable member, normally lying beyond the farthest travel of the releasable connection; an abutment on the differentially adjustable member and adjustable thereby into the path of the releasable connection; a projection on the differentially adjustable member; a linkage operated by the differentially adjustable member; and a displacing lever operable by the linkage to shift the zero-arresting pawl to idle position upon the setting of the differentially adjustable member to any point out of normal, the projection adapted to hold the linkage in operated position until the differentially adjustable member is restored to its normal idle position.

6. In a machine of the class described, the combination of a differentially movable member; a driver therefor; a releasable latch connecting the driver and the member; an arresting pawl to release the member from the driver in the zero position; a manually differentially adjustable device normally in a position outside the path of travel of said member and adapted to control said arresting pawl and said member; connections intermediate said pawl and said device to move said pawl to an ineffective position; and means on said device normally contacting said connections to actuate the same upon the initial movement of said device out of its normal position.

In testimony whereof I affix my signature.

BERNIS M. SHIPLEY.